US012812273B2

(12) United States Patent
Lazovsky et al.

(10) Patent No.: US 12,812,273 B2
(45) Date of Patent: Nov. 24, 2026

(54) SYSTEMS AND METHODS FOR SWITCHING

(71) Applicant: SICILY MERGER SUB II, INC., Santa Clara, CA (US)

(72) Inventors: David Lazovsky, Los Gatos, CA (US); Philip Winterbottom, San Jose, CA (US); Francisco Jose Maia da Silva, Oporto (PT); Martinus Bos, San Jose, CA (US)

(73) Assignee: SICILY MERGER SUB II, INC., Santa Clara, CA (US)

( * ) Notice: Subject to any disclaimer, the term of this patent is extended or adjusted under 35 U.S.C. 154(b) by 0 days.

(21) Appl. No.: 19/426,027

(22) Filed: Dec. 18, 2025

(65) Prior Publication Data

US 2026/0129321 A1 May 7, 2026

Related U.S. Application Data

(63) Continuation of application No. PCT/US2024/052458, filed on Oct. 22, 2024.

(60) Provisional application No. 63/592,509, filed on Oct. 23, 2023.

(51) Int. Cl.
*H04Q 11/00* (2006.01)

(52) U.S. Cl.
CPC . *H04Q 11/0005* (2013.01); *H04Q 2011/0007* (2013.01)

(58) Field of Classification Search
CPC .................................................. H04Q 11/0005
See application file for complete search history.

(56) References Cited

U.S. PATENT DOCUMENTS

| | | | | |
|---|---|---|---|---|
| 7,840,136 | B1 * | 11/2010 | Cunningham | H04Q 11/0005 385/16 |
| 11,165,509 | B1 * | 11/2021 | Nagarajan | H04B 10/506 |
| 11,177,219 | B1 * | 11/2021 | Youn | H10W 70/611 |
| 11,509,397 | B2 | 11/2022 | Ma et al. | |
| 11,817,903 | B2 | 11/2023 | Pleros et al. | |
| 11,835,777 | B2 | 12/2023 | Winterbottom et al. | |

(Continued)

OTHER PUBLICATIONS

Raj et al., "Design of a 50-Gb/s Hybrid Integrated Si-Photonic Optical Link in 16-nm FinFET", IEEE Journal of Solid-State Circuits vol. 55, No. 4, Apr. 2020 (Year: 2020).*

(Continued)

*Primary Examiner* — Shi K Li
(74) *Attorney, Agent, or Firm* — Fish & Richardson P.C.

(57) ABSTRACT

Systems and methods for switching are disclosed. In an example, a switching system includes a photonic integrated circuit (PIC) having optical ports, an electric integrated circuit (EIC) stacked on the PIC and having switching circuitry, and photonic transceivers optically coupled to the optical ports of the PIC and electrically coupled to the switching circuitry of the EIC, and the switching circuitry is configured to transfer digital signals, which are generated from optical signals received at a first photonic transceiver of the photonic transceivers, to a second photonic transceiver of the photonic transceivers based on information in the digital signals, wherein the first photonic transceiver is optically coupled to a first optical port of the PIC and the second photonic transceiver is optically coupled to a second optical port of the PIC.

26 Claims, 19 Drawing Sheets

(56) References Cited

U.S. PATENT DOCUMENTS

| | | | | |
|---|---|---|---|---|
| 12,164,161 | B1 | 12/2024 | Winterbottom et al. | |
| 12,189,198 | B1 | 1/2025 | Aggarwal et al. | |
| 12,191,257 | B2 | 1/2025 | Aggarwal | |
| 12,197,023 | B1 | 1/2025 | Aggarwal et al. | |
| 12,216,318 | B2 | 2/2025 | Winterbottom et al. | |
| 12,217,056 | B2 | 2/2025 | Aggarwal et al. | |
| 12,253,763 | B2 | 3/2025 | Okuyama et al. | |
| 12,259,575 | B2 | 3/2025 | Winterbottom et al. | |
| 12,271,595 | B2 | 4/2025 | Lazovsky et al. | |
| 12,298,608 | B1 | 5/2025 | Winterbottom et al. | |
| 12,339,492 | B2 | 6/2025 | Bos et al. | |
| 12,431,689 | B2 | 9/2025 | Yang | |
| 2020/0314511 | A1 | 10/2020 | Rickman et al. | |
| 2021/0028534 | A1 | 1/2021 | Liu et al. | |
| 2022/0012582 | A1 | 1/2022 | Pleros et al. | |
| 2022/0052759 | A1 | 2/2022 | Mola et al. | |
| 2022/0158736 | A1 | 5/2022 | Testa et al. | |
| 2022/0404544 | A1 | 12/2022 | Winterbottom et al. | |
| 2022/0405056 | A1 | 12/2022 | Winterbottom et al. | |
| 2022/0405566 | A1 | 12/2022 | Winterbottom et al. | |
| 2023/0104033 | A1 | 4/2023 | Pleros et al. | |
| 2023/0296838 | A1 | 9/2023 | Lazovsky et al. | |
| 2023/0296854 | A1 | 9/2023 | Winterbottom et al. | |
| 2023/0297237 | A1 | 9/2023 | Lazovsky et al. | |
| 2023/0418010 | A1 | 12/2023 | Winterbottom et al. | |
| 2024/0013041 | A1 | 1/2024 | Pleros et al. | |
| 2024/0038657 | A1 | 2/2024 | Aggarwal et al. | |
| 2024/0038694 | A1 | 2/2024 | Aggarwal et al. | |
| 2024/0038695 | A1 | 2/2024 | Aggarwal et al. | |
| 2024/0098104 | A1 * | 3/2024 | Patronas | H04L 41/16 |
| 2024/0145328 | A1 | 5/2024 | Sahni | |
| 2024/0176169 | A1 | 5/2024 | Sahni et al. | |
| 2024/0219664 | A1 | 7/2024 | Winterbottom et al. | |
| 2024/0272392 | A1 | 8/2024 | Winterbottom et al. | |
| 2024/0272393 | A1 | 8/2024 | Winterbottom et al. | |
| 2025/0026309 | A1 * | 1/2025 | Sunny | H04W 12/121 |
| 2025/0076572 | A1 | 3/2025 | Winterbottom et al. | |
| 2025/0102838 | A1 | 3/2025 | Thomas et al. | |
| 2025/0155736 | A1 | 5/2025 | Scofield | |
| 2025/0190357 | A1 | 6/2025 | Maia Da Silva et al. | |
| 2025/0216598 | A1 | 7/2025 | Aggarwal et al. | |
| 2025/0216627 | A1 | 7/2025 | Sahni et al. | |
| 2025/0216705 | A1 | 7/2025 | Staffaroni et al. | |
| 2025/0216706 | A1 | 7/2025 | Staffaroni et al. | |
| 2025/0216708 | A1 | 7/2025 | Ramachandra et al. | |
| 2025/0219034 | A1 | 7/2025 | Staffaroni et al. | |
| 2025/0244876 | A1 | 7/2025 | Lazovsky et al. | |
| 2025/0370199 | A1 | 12/2025 | Aggarwal et al. | |
| 2025/0370205 | A1 | 12/2025 | Aggarwal et al. | |
| 2025/0370206 | A1 | 12/2025 | Aggarwal et al. | |
| 2025/0372590 | A1 | 12/2025 | Oh et al. | |

OTHER PUBLICATIONS

AyarLabs Staff, "Technical Brief," AyarLabs, Dec 6, 2021, retrieved on May 7, 2026, retrieved from URL <https://ayarlabs.com/resource/technical-brief-optical-i-o-chiplets-eliminate-bottlenecks-to-unleash-innovation/>, 10 pages.

Berger et al., "Design tradeoffs in CXL-based memory pools for public cloud platforms," IEEE Micro, 2023, 43:30-38, 10 pages.

Coenen et al., "Electro-absorption modulator thermo-optical self-heating analysis," J. Light. Technol., Apr. 24, 2023, 41(18):6000-6006.

Daudlin et al., "3D photonics for ultra-low energy, high bandwidth-density chip data links," arXiv preprint, Submitted Oct. 2, 2023, arXiv:2310.01615, 17 pages (With Supplementary Information).

Ding et al., "Evaluating the Potential of Desaggregated Memory Systems for HPC applications," arXiv:2306.04014v2 [cs.DC], Jun. 16, 2023, retrieved from URL <https://arxiv.org/pdf/2306.04014>, 16 pages.

Gholami, "AI and Memory Wall," medium.com, available on or before Mar. 27, 2021, retrieved on Oct. 16, 2023, retrieved from URL <https://medium.com/riselab/ai-and-memory-wall-2cb4265cb0b8>, 15 pages.

github.com, "NVIDIA GPU P2P Benchmark bandwidth/throughput and latency," github.com, available on or before Feb. 8, 2024, retrieved on May 7, 2026, retrieved from URL <https://gist.github.com/joshlk/bbblaca6e70b11d251886baee6423dcb>, 4 pages.

Harris, "Introducing envise, idiom and passage—next generation AI compute, compile and interconnect platforms," medium.com, Mar. 10, 2021, retrieved on Oct. 16, 2023, retrieved from URL <https://medium.com/lightmatter/introducing-envise-idiom-and-passage-next-generation-ai-compute-compile-and-interconnect-331878d6cea5>, 6 pages.

Howard, "The First Direct Mesh-to-Mesh Photonic Fabric," in IEEE Hot Chips 35 Symp. (HCS), 2023, Palo Alto, CA, USA, 17 pages.

International Preliminary Report on Patentability in International Appln. No. PCT/US2024/052458, date Apr. 28, 2026, 6 pages.

International Search Report and Written Opinion in International Appln. No. PCT/US2024/052458, dated Feb. 9, 2025, 9 pages.

Lee et al., "Beyond CPO: A motivation and approach for bringing optics onto the silicon interposer," J. Light. Technol., 2023, 41:1152-1162.

Li et al., "Evaluating Modern GPU Interconnect: PCIe, NVLink, NV-SLI, NVSwitch and GPUDirect," arXiv:1903.04611v1 [cs.AR], Mar. 11, 2019, retrieved from URL <https://arxiv.org/pdf/1903.04611>, 15 pages.

Li et al., "Analyzing resource utilization in an HPC system: A case study of NERSC's Perlmutter," High Performance Computing, 2023, Springer Nature Switzerland, 297-316.

Lightelligence, "Hummingbird™ processor," lightelligence.ai, available on or before 2022, retrieved on Oct. 16, 2023, retrieved from URL<https://www.lightelligence.ai/index.php/product/hummingbird.html>, 1 page.

Rahim et al., "Taking silicon photonics modulators to a higher performance level: state-of-the-art and a review of new technologies," Adv. Photonics, Mar.-Apr. 2021, 3:024003, 23 pages.

Sahni et al., "Beyond the Beachfront: Integration of Silicon Photonic I/Os under a High-Power ASIC," Optical Fiber Commun. Conf and Expo. (OFC), 2024, San Diego, CA, USA, 3 pages.

Shah, "For the First Time, UCIe Shares Bandwidth Speeds Between Chiplets," hpcwire.com, Jun. 7, 2023, retrieved from URL <https://www.hpcwire.com/2023/06/07/for-the-first-time-ucie-shares-bandwidth-speeds-between-chiplets/>, 17 pages.

Spet'ko et al., "DGX-A100 Face to Face DGX—2-Performance, Power and Thermal Behavior Evaluation," Energies, 2021, 14:376, 18 pages.

Sunny et al., "Machine learning accelerators in 2.5D chiplet platforms with silicon photonics," Design, Automation & Test in Europe Conf & Exhibition, 2023, 6 pages.

Verbist et al., "100 Gb/s DAC-less and DSP-free transmitters using GeSi EAMs for short-reach optical interconnects," Optical Fiber Commun. Conf and Expo. (OFC), 2018, 3 pages.

Ward-Foxton, "Lightelligence Debuts Electronic AI Accelerator With Optical NoC," eetimes.com, Jun. 28, 2023, retrieved on May 7, 2026, retrieved from URL <https://www.eetimes.com/lightelligence-debuts-new-electronic-ai-accelerator/>, 6 pages.

Ward-Foxton, "Optical Chip Solves Hardest Math Problems Faster than GPUs," eetimes.com, Dec 15, 2021, retrieved on May 7, 2026, retrieved from URL <https://www.eetimes.com/optical-computing-chip-runs-hardest-math-problems-100x-faster-than-gpus/>, 5 pages.

Wu et al., "Sustainable AI: Environmental implications, challenges and opportunities," Proc. Mach. Learn. Syst., 2022, 4:795-813, 19 pages.

* cited by examiner

990

| 12-Bit Value | Node ID (E.g., IP Address) | Optical Port ID |
|---|---|---|
| xxxx xxxx xxxx | 192.168.30.112 | P10 |
| xxxx xxxx xxxx | 192.168.30.238 | P2 |
| xxxx xxxx xxxx | 192.168.31.211 | P16 |
| xxxx xxxx xxxx | 192.168.30.74 | P4 |
| ⋮ | ⋮ | ⋮ |
| xxxx xxxx xxxx | 192.168.30.120 | P20 |
| xxxx xxxx xxxx | 192.168.32.173 | P6 |

SYSTEMS AND METHODS FOR SWITCHING

CROSS-REFERENCES

This is a U.S. continuation application under 35 U.S.C. 111(a) claiming priority under 35 U.S.C. 120 to international patent application PCT/US2024/052458, filed Oct. 22, 2024, which is incorporated by reference herein, and which is entitled to the benefit of provisional U.S. Patent Application Ser. No. 63/592,509, filed Oct. 23, 2023, also incorporated by reference herein.

BACKGROUND

Demands for artificial intelligence (AI) computing, such as machine learning (ML) and deep learning (DL), are increasing faster than they can be met by increases in available processing capacity. This rising demand and the growing complexity of AI models drive the need to move large volumes of data between compute and/or memory nodes in a data center. In many conventional systems, data movement leads to significant power consumption, poor performance, and excessive latency. Thus, multi-node computing systems that can process and transmit data between nodes quickly and efficiently may be advantageous for the implementation of AI computing.

BRIEF DESCRIPTION OF THE DRAWINGS

Throughout the description, similar reference numbers may be used to identify similar elements.

DETAILED DESCRIPTION

A multiport network switch is used to direct network traffic from an input port of the multiport network switch to an output port of the multiport network switch based on some information in the network traffic, e.g., some header information in data packets of the network traffic. With higher levels of integration, much of the functionality of a multiport network switch can be integrated into a single chip, e.g., a single IC device. While various examples of single-chip multiport network switches exist, the data interfaces to and from the IC devices, often referred to as media independent interfaces (MIIs), are physically located at the edge, or beachfront, of the IC devices and physical layer "PHY" devices (e.g., optical fiber PHY devices and/or copper wire PHY devices) are typically located off-chip near a perimeter edge of the IC device and coplanar with the IC device. For example, a single-chip switch is typically mounted on a printed circuit board (PCB) and the PHY devices are connected to the PCB at a perimeter edge, or edges, of the single-chip switch. In particular, for a switch that has multiple optical ports, the transformation of signals from the optical domain to the electrical domain and the transformation of signals from the electrical domain to the optical domain happens exclusively at the beachfront, or perimeter edges, of the IC device. As the desired number of ports on a multiport network switch increases and/or the size of an IC device decreases, the amount of physical real estate at the edges of an IC device can become a limiting factor with regard to the number of ports that can be supported by a single-chip multiport network switch. However, it has been realized that photonic transceivers formed by an electronic integrated circuit (EIC) stacked on a photonic integrated circuit (PIC) can be coupled with switching circuitry in the EIC to produce a multiport network switch that can switch data between optical ports of the multiport network switch without being limited to the beachfront of the EIC. In an example, at least some of the photonic transceivers are physically located in an interior region of the EIC as opposed to conventional single-chip switches in which the data interfaces (e.g., MIIs) to the IC device are exclusively located at perimeter edges of the IC device. Such a multiport network switch enables high speed network switching with a port density and power efficiency that heretofore has not been achieved.

In an example, the multiport network switch can be deployed in a data center that is implementing, for example, machine learning (ML) models and/or artificial neural networks (ANNs). In one specific example, the multiport network switch can be deployed as a Top-of-Rack (ToR) switch in a data center that utilizes a leaf-spine network architecture to connect nodes, e.g., compute nodes and/or memory nodes, which are running ANN workloads, across multiple racks of such nodes.

Figure 1A:
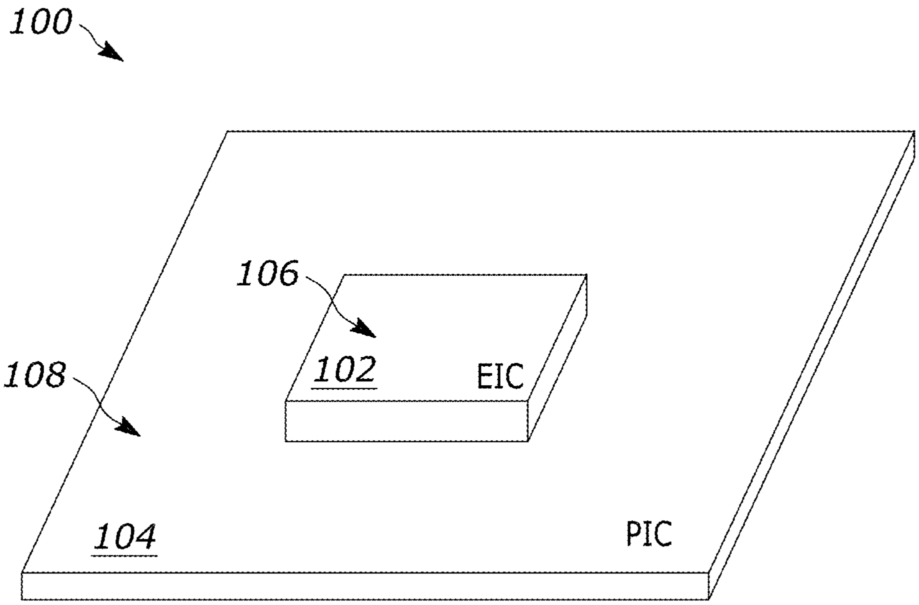
FIG. 1A is a perspective view of an example of a circuit package that includes an EIC that is stacked on a PIC to produce a multiport network switch.

FIG. 1A is a perspective view of an example of a circuit package 100 that includes an EIC 102 that is stacked on a PIC 104 to produce a multiport network switch that includes multiple photonic transceivers (not shown). In the example, both the EIC and the PIC are planar structures that have two major surfaces, referred to herein as a top major surface and a bottom major surface. In the perspective view of FIG. 1A, the top major surfaces 106 and 108 of both the EIC and the PIC are visible and the bottom major surface of the EIC is directly adjacent to, and parallel to the plane of, the top major surface of the PIC. It should be noted that the EIC and the PIC are not to scale and their sizes relative to each other may be different from that which is shown in FIG. 1A.

Additionally, the PIC may be attached to a planar substrate that includes electrical connections to the PIC and to the EIC. In an example, the EIC and PIC are physically and electrically connected to each other by electrical interconnects, e.g., solder bumps, and the distance between the bottom major surface of the EIC and the top major surface of the PIC is less than 2 mm and in many cases less than 50 microns.

Figure 1B:
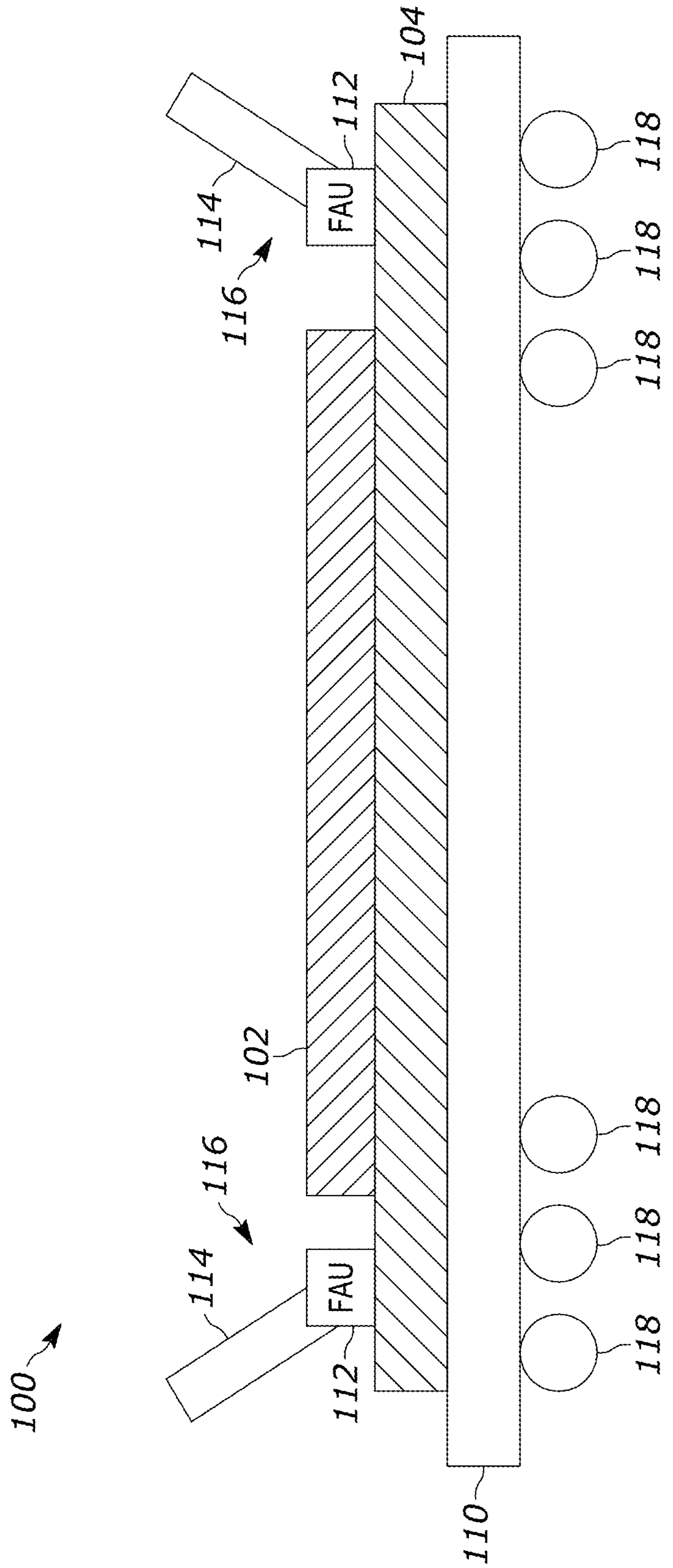
FIG. 1B is a side view of the circuit package from FIG. 1A that includes the EIC and the PIC, and in which the PIC is mounted on a substrate.

FIG. 1B is a side view of the circuit package 100 from FIG. 1A that includes the EIC 102 and the PIC 104, and in which the PIC is mounted on a substrate 110. FIG. 1B also depicts optical elements, including optical interfaces such as fiber array units (FAUs) 112 on the PIC and external waveguides 114 (e.g., optical fibers) connected to the FAUs that correspond to optical ports 116 of the multiport network switch. Again, it should be noted that the elements depicted in FIG. 1B may not be to scale. In the example of FIGS. 1A and 1B, the EIC and the PIC are formed in separate semiconductor chips, typically silicon chips, although the use of other semiconductor materials is possible. In the example of FIG. 1B, the PIC is attached directly to the substrate and the substrate includes solder bumps 118 for subsequent mounting to, for example, a printed circuit board (PCB). In the example of FIG. 1B, the FAUs that connect the PIC to the external waveguides (e.g., optical fibers) are positioned on top of and optically connected to the PIC although other means of connecting optical waveguides to the PIC are possible. Optionally, the circuit package 100 shown in FIGS. 1A and 1B may further include other elements, such as memory that is attached on to the PIC.

In an example, an FAU is a device used in optical communication systems that combines or separates optical signals from multiple fibers into a single optical signal or multiple optical signals, respectively. The FAU can be used for a variety of applications, such as wavelength division multiplexing (WDM), parallel optical interconnects, and optical sensing. There are two main types of fiber array units that can be used: linear and circular. Linear FAUs combine or separate optical signals along a straight line, while circular fiber array units combine or separate optical signals in a circular configuration. Both types of FAUs are typically made from a precision-molded optical plastic or ceramic material and can have anywhere from a few to hundreds of fibers arranged in a specific pattern. The choice of FAU depends on the specific requirements of an application, such as the number of fibers, the arrangement of the fibers, the wavelength of light being used, and the coupling efficiency desired.

In an example, the EIC 102 includes high-speed integrated circuits configured to support the photonic transceivers and the data switching. The EIC may be an application specific integrated circuit (ASIC), a field programmable gate array (FPGA), or a System on Chip (SoC) that is designed and fabricated using state of the art CMOS nodes. The EIC may include circuits for serialization/deserialization, clock and data recovery, modulator drivers, and amplifiers that implement the photonic transceivers and circuits that implement the switching circuitry.

A waveguide may be a structure that guides and/or confines light waves to facilitate the propagation of the light along a desired path and to a desired location. For example, a waveguide may be an optical fiber, a planar waveguide, a glass-etched waveguide, a photonic crystal waveguide, a free-space waveguide, any other suitable structure for directing optical signals, and combinations thereof. In some embodiments, one or more internal waveguides are formed in the PIC 104. In some embodiments, one or more external waveguides are implemented external to the PIC, such as the optical fibers 114 or a ribbon comprising multiple optical fibers.

The PIC 104 may include one or more internal waveguides that are optically coupled to the optical ports 116 of the multiport network switch. For example, as will be discussed below in more detail, one or more of the optical ports may be optically coupled to another optical port on another computing device. In some examples, an internal waveguide of the PIC is implemented (e.g., formed) in the PIC to connect photonic elements internally within the PIC. In another example, one or more optical ports of the PIC may be optically coupled to an optical port of another computing device located in a separate circuit package or separate chip to form inter-chip connections. In some embodiments, an external waveguide is implemented in connection with the PIC in order to connect photonic ports across multiple chips. For example, the optical ports of the PIC may be connected via optical fibers across multiple chips. In some embodiments, an external waveguide (e.g., optical fiber) connects directly to photonic ports of respective computing devices across multiple chips. In some embodiments, an external waveguide is implemented in connection with one or more internal waveguides formed in the PIC of one or more of the chips. For example, one or more internal waveguides may internally connect one or more of the photonic ports to one or more additional optical components located at another portion of the circuit package (e.g., another portion of the PIC) to facilitate coupling with the external waveguides. For example, the internal waveguides within the PIC may connect to one or more optical coupling structures including FAUs located over grating couplers (GCs), or edge couplers. In some embodiments, one or more FAUs are implemented to facilitate coupling the external waveguides to the internal waveguides to facilitate chip-to-chip interconnection to another circuit package to both transmit and receive optical signals. In some embodiments, one or more FAUs are implemented to supply optical power from an external laser light source to the PIC to drive the photonics (e.g., provide one or more optical carrier signals) in the PIC.

In an example, the EIC 102 and the PIC 104 may be manufactured using standard wafer fabrication processes, including, e.g., photolithographic patterning, etching, ion implantation, etc. Further, in some embodiments, heterogeneous material platforms and integration processes are used. For example, various active photonic components, such as laser light sources and optical modulators and/or photodetectors used in the photonic transceivers, may be implemented using group III-V semiconductor components.

As will be appreciated by those of ordinary skill in the art, the depicted structure of the circuit package 100 is merely one of several possible ways to assemble and package the various components. In some examples, some or all of the EIC 102 is disposed on the substrate 110. In some examples, it is also possible to create the EIC and the PIC 104 in different layers of a single semiconductor chip. In some examples, the photonic circuit layer includes or is made of multiple PICs. Multiple layers of PICs, or a multi-layer PIC may help to reduce waveguide crossings. Moreover, the structure depicted in FIGS. 1A and 1B may be modified to include multiple EICs connected to a single PIC. For example, multiple EICs may be connected to each other via photonic channels in the PIC.

In an example, a light source, or light sources, is/are optically coupled to the circuit package 100, e.g., a multiport network switch. The light source or light sources may include laser light sources that are implemented either in the circuit package or externally. When implemented externally, a connection to the circuit package may be made optically using a grating coupler in the PIC 104 underneath an FAU 112 and/or using an edge coupler. In some embodiments, lasers are implemented in the circuit package by using an interposer containing several lasers that can be co-packaged and edge-coupled with the PIC. In some embodiments, the lasers are integrated directly into the PIC using heterogenous or homogenous integration. Homogenous integration allows lasers to be directly implemented in the silicon substrate in which the waveguides of the PIC are formed, and allows for lasers of different materials, such as indium phosphide (InP), and architectures such as, quantum dot lasers. Heterogenous assembly of lasers on the PIC allows for group III-V semiconductors or other materials to be precision-attached onto the PIC and optically coupled to a waveguide implemented on the PIC.

Figure 2A:
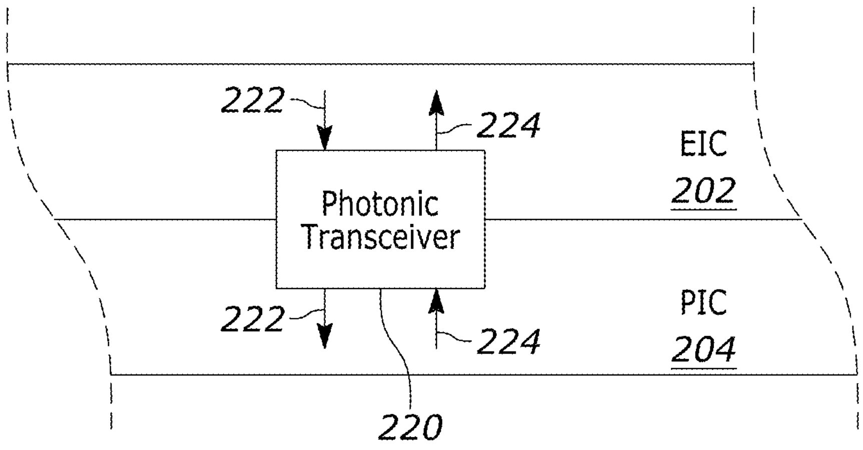
FIG. 2A is a side view of an example photonic transceiver of a multiport network switch relative to an EIC and a PIC in which a portion of the photonic transceiver is embodied in the EIC and a portion of the photonic transceiver is embodied in the PIC.

In an example, data is communicated between the EIC 102 and the PIC 104 using photonic transceivers in which each photonic transceiver includes a first portion in the EIC and a second portion in the PIC. FIG. 2A is a side view of an example photonic transceiver 220 of a multiport network switch relative to an EIC 202 and a PIC 204 in which a portion of the photonic transceiver is embodied in the EIC and a portion of the photonic transceiver is embodied in the PIC. Although not shown in FIG. 2A, in an example multiport network switch, the photonic transceiver is optically coupled to an optical port of the PIC and electrically coupled to switching circuitry of the EIC. As indicated by the arrows and as is described further below, digital data can be passed from the electrical domain of the EIC to the optical domain of the PIC (arrows 222) and digital data can be passed from the optical domain of the PIC to the electrical domain of the PIC (arrows 224). Examples of how the photonic transceivers are used to form a multiport network switch are described below.

Figure 2B:
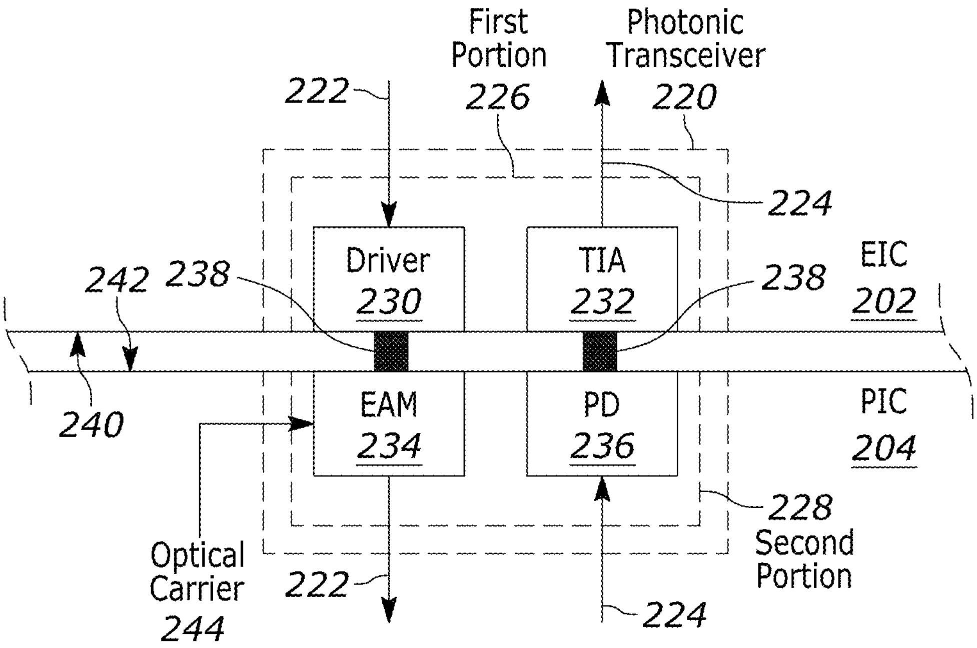
FIG. 2B is an expanded side view of the photonic transceiver from FIG. 2A.

FIG. 2B is an expanded side view of the photonic transceiver 220 from FIG. 2A in which a first portion 226 of the photonic transceiver in the EIC 202 includes a driver 230 and an amplifier 232 (e.g., a transimpedance amplifier (TIA)) and a second portion 228 of the photonic transceiver in the PIC 204 includes a modulator 234 (e.g., an Electro-Absorption Modulator (EAM)) and a photodetector 236. The first portion of the photonic transceiver and the second portion of the photonic transceiver are electrically connected to each other by electrical interconnects 238. In an example, the electrical interconnects are copper pillars no longer than 2 millimeters and in many cases less than 50 microns. In other examples, the electrical interconnects can be solder bumps that are formed of a material such as tin, silver, or copper. If solder bumps are used for the electrical interconnects, then the solder bumps may be flip-chip bumps. In yet another example, the interconnects may be elements of a ball-grid array (BGA), pins of a pin grid array (PGA), elements of a land grid array (LGA), or some other type of electrical interconnect. Generally, the electrical interconnects may physically and electrically couple the portion of a photonic transceiver that is in the EIC to the portion of the photonic transceiver that is in the PIC. For example, one or more of the electrical interconnects may physically couple with, and allow electrical signals to pass between, conductive pads of the EIC and conductive pads of the PIC. The electrical interconnects may not have a uniform size, shape, or pitch. A finer pitch of interconnects may be desirable to allow a denser communication pathway between elements coupled to the PIC. In some implementations, the size, shape, pitch, or type of one or more of the electrical interconnects may be different than depicted in the figures, or different than others of the electrical interconnects. The specific type, size, shape, or pitch of the electrical interconnects may be based on one or more factors such as use case, materials used, design considerations, and manufacturing considerations.

In an example, the driver 230 and the amplifier 232 of the first portion 226 of the photonic transceiver 220 include electronic circuits that are fabricated in the EIC 202. In an example, the first portion of the photonic transceiver is an analog/mixed signal (AMS) block that includes circuits for processing analog signals or circuits for processing analog signals and circuits for processing digital signals. The driver of the first portion of the photonic transceiver may include digital control and analog amplifier circuits. In an example, the driver includes a driver interface (not shown) that is exposed at the bottom major surface 240 of the EIC. The amplifier of the first portion of the photonic transceiver may include a transimpedance amplifier (TIA). In an example, the amplifier includes an amplifier interface (not shown) that is also exposed at the bottom major surface of the EIC. In an example, the driver interface and the amplifier interface include one or more conductive contacts or pads that are electrically coupled to electronic circuits of the respective components and that are exposed at the bottom major surface of the EIC.

The modulator 234 of the second portion 228 of the photonic transceiver 220 may include an Electro-Absorption Modulator (EAM) that is fabricated into the PIC 204, for example, the EAM may be a Germanium-Silicon (GeSi) EAM. Other examples of optical modulators include, but are not limited to, micro-ring resonators (MRRs), or any suitable optical component with sufficient thermal stability over the operating ranges of the photonic transceivers. In an example, the modulator includes a modulator interface (not shown) that is exposed at the top major surface 242 of the PIC. For example, the modulator interface may include one or more conductive contacts or pads that are electrically coupled to the modulator and that are exposed at the top major surface of the PIC.

The photodetector 236 of the second portion 228 of the photonic transceiver 220 includes electronic circuits that are fabricated into the PIC 204, for example, the photodetector may be a GeSi photodetector. In an example, the photodetector includes a photodiode and a photodetector interface (not shown) that are fabricated into the PIC. For example, the photodetector interface may include one or more conductive contacts that are exposed at the top major surface of the PIC.

FIG. 2B also illustrates the passing of data from the electrical domain of the EIC 202 to the optical domain of the PIC 204 (e.g., via the arrows 222 pointing "down" into the driver 230 and out from the modulator 234) and the passing of data from the optical domain of the PIC to the electrical domain of the EIC (e.g., via the arrows 224 pointing "up" into the photodetector 236 and out from the amplifier 232). With reference to the left side of FIG. 2B, in an example operation, signals representative of digital data are applied to the driver in the EIC, which cause the driver to generate signals that are passed through the interconnect 238 and drive the modulator in the PIC. In an example, an optical carrier 244 is modulated by the modulator in response to the signals from the driver and the modulated optical carrier propagates within an optical waveguide (not shown) of the PIC. Thus, the left side of FIG. 2B illustrates the transformation of signals from the electrical domain to the optical domain between the stacked EIC and PIC. With reference to the right side of FIG. 2B, a modulated optical carrier is received at the photodetector via an optical waveguide (not shown) of the PIC. The photodetector converts the modulated optical carrier into electrical signals that are passed via the interconnect to the amplifier of the EIC. The amplifier of the EIC amplifies the electrical signals and provides the amplified electrical signals to another component of the EIC, such as to an analog-to-digital converter (ADC) of the EIC. Thus, the right side of FIG. 2B illustrates the transformation of signals from the optical domain to the electrical domain between the stacked EIC and PIC.

As stated above, it has been realized that photonic transceivers formed by an EIC stacked on a PIC as described with reference to FIGS. 2A and 2B can be coupled with switching circuitry in the EIC to form a multiport network switch that can switch data between optical ports of the multiport network switch without being limited to the beachfront of an IC device. In accordance with an example embodiment, a multiport network switch includes an EIC that has switching circuitry stacked on a PIC that has multiple optical ports, and photonic transceivers that are optically coupled to the optical ports of the PIC and electrically coupled to switching circuitry of the EIC. The multiport network switch enables data to be switched from a first optical port of the multiport network switch to a second optical port of the multiport network switch via the photonic transceivers and the switching circuitry based on information in the data that is received at the first optical port. In an example, at least some of the photonic transceivers can be physically located in an interior region of the EIC as opposed to conventional single-chip switches in which the data interfaces to the IC device are exclusively located at edges of the IC device. Because the multiport network switch employs photonic transceivers that are formed by an EIC stacked on a PIC, the transformation of signals from the optical domain to the electrical domain and the transformation of signals from the electrical domain to the optical domain does not have to happen at the beachfront, or edges, of the EIC, but can instead happen wherever the drivers and amplifiers are fabricated on the EIC. Thus, the number of ports that can be included in a multiport network switch is not limited to the beachfront, or edge dimensions, of the EIC. In one particularly useful example, the multiport network switch is configured for use in a leaf-spine network architecture. In one example, the photonic transceivers include spine photonic transceivers and leaf photonic transceivers and in another example, the photonic transceivers include spine photonic transceivers surrounded by the switching circuitry, and the leaf photonic transceivers surrounding the switching circuitry.

In an example, a first portion of each photonic transceiver is in the EIC and a second portion of each photonic transceiver is in the PIC and interfaces of the first portion of each photonic transceiver in the EIC are vertically aligned with interfaces of the second portion of the corresponding photonic transceiver in the PIC as described with reference to FIGS. 2A and 2B. For example, the first portion of a photonic transceiver in the EIC includes a driver and an amplifier, the second portion of the photonic transceiver in the PIC includes a modulator and a photodetector, and an interface of the driver in the EIC is vertically aligned with an interface of the modulator in the PIC and an interface of the amplifier in the EIC is vertically aligned with an interface of the photodetector in the PIC. An example of a multiport network switch that includes an EIC stacked on a PIC is described with reference to FIG. 3A-3C. In an example, the EIC is stacked on the PIC as described with reference to FIGS. 1, 2A and 2B.

Figure 3A:
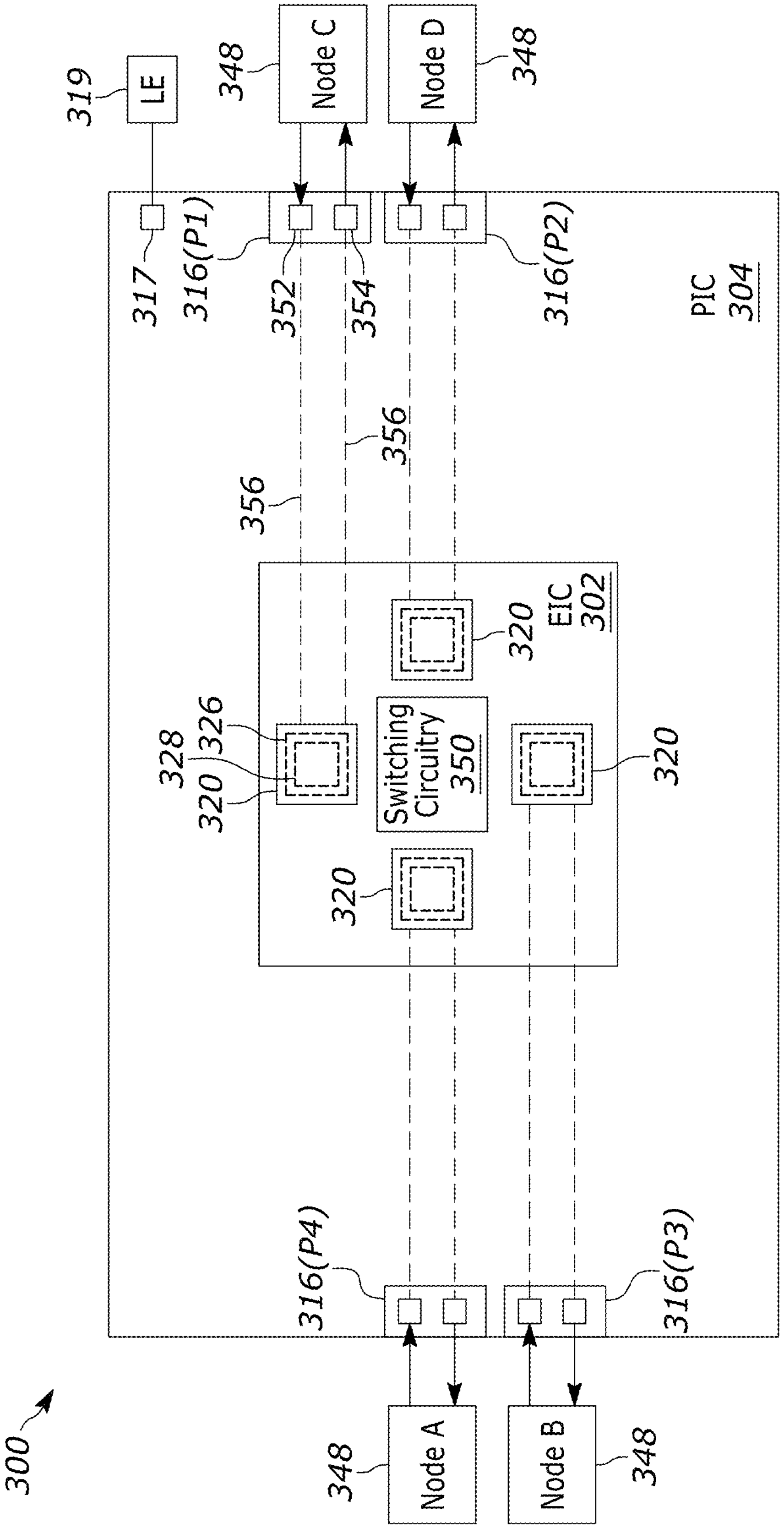
FIG. 3A is a top view of an example of a multiport network switch that is coupled between four different nodes that are external to the multiport network switch.

FIG. 3A is a top view of an example of a multiport network switch 300 that is coupled between four different nodes 348, node A, node B, node C, and node D, that are external to the multiport network switch. In an example, the nodes may include compute components, memory components, or a combination thereof and the multiport network switch is able to switch network traffic from an input optical port of the multiport network switch to an output optical port of the multiport network switch based on information in the network traffic that is received at the input optical port of the multiport network switch. For example, the multiport network switch is able to determine where to switch received network traffic based on header information in the received network traffic. In the example of FIG. 3A, the multiport network switch includes an EIC 302 stacked on a PIC 304 as illustrated in the top view. The multiport network switch has four optical ports 316 (e.g., ports P1, P2, P3, P4), although it should be understood that the number of optical ports of the multiport network switch can be different. In an example, the multiport network switch includes four photonic transceivers 320, with each photonic transceiver having a first portion 326 in the EIC (e.g., a driver and an amplifier) and a second portion 328 in the PIC (e.g., a modulator and a photodetector), and the EIC includes switching circuitry 350. For example, the switching circuitry may include a switch fabric, an arbiter, a scheduler, and a media access control (MAC) table. In an example, the switch fabric is a crosspoint matrix in which each photonic transceiver can be individually connected to each of the other photonic transceivers. In an example, each optical port of the multiport network switch includes two optical interfaces in the PIC, one optical interface 352 to receive optical signals from an external device and one optical interface 354 to output optical signals to an external device, e.g., to the same node. In an example, each optical interface of an optical port is part of a unidirectional optical channel in the PIC that includes the optical interface, an optical waveguide 356, and a second portion of a photonic transceiver component, e.g., either a modulator or a photodetector. Two unidirectional optical channels of an optical port combine to form a bidirectional optical channel between the multiport network switch and another node, e.g., a compute node or a memory node.

As illustrated in the top view of FIG. 3A, for each photonic transceiver 320, the first portion 326 of the photonic transceiver, which is in the EIC 302, is vertically aligned with a corresponding second portion 328 of the photonic transceiver, which is in the PIC 304. Additionally, as shown in the top view of FIG. 3A, the EIC has a footprint and the photonic transceivers are located in an interior region of the footprint of the EIC and not at an edge, or edges, of the EIC as is conventional. In an example, a photonic transceiver is located in an interior region of the EIC when other circuits of the EIC are located between the circuits of the photonic transceiver and an edge of the EIC and a photonic transceiver is located in an exterior region of the EIC when no other circuits of the EIC are located between the circuits of the photonic transceiver and an edge of the EIC.

As illustrated in the top view of FIG. 3A, a light engine 319 is optically connected to the PIC 304 via optical port 317. The light engine may include one or more lasers, such as, without limitation, distributed feedback (DFB) lasers or other laser diodes implemented, e.g., in III-V compound semiconductor materials, to generate an optical carrier. Multiple lasers emitting at the same wavelength may be used to generate light for multiple photonic circuits at one or more wavelengths. Alternatively or additionally, the light engine may include multiple lasers emitting at different wavelengths, as well as a wavelength multiplexer, e.g., implemented as an arrayed waveguide grating, to combine the different wavelengths into a single, multiplexed optical carrier signal. In an example, the light engines generate light in the range of 980-1,580 nm, and in another example, the light engines generate light in the L-band (e.g., 1,570-1,580 nm), although other wavelength ranges are possible.

Figure 3B:
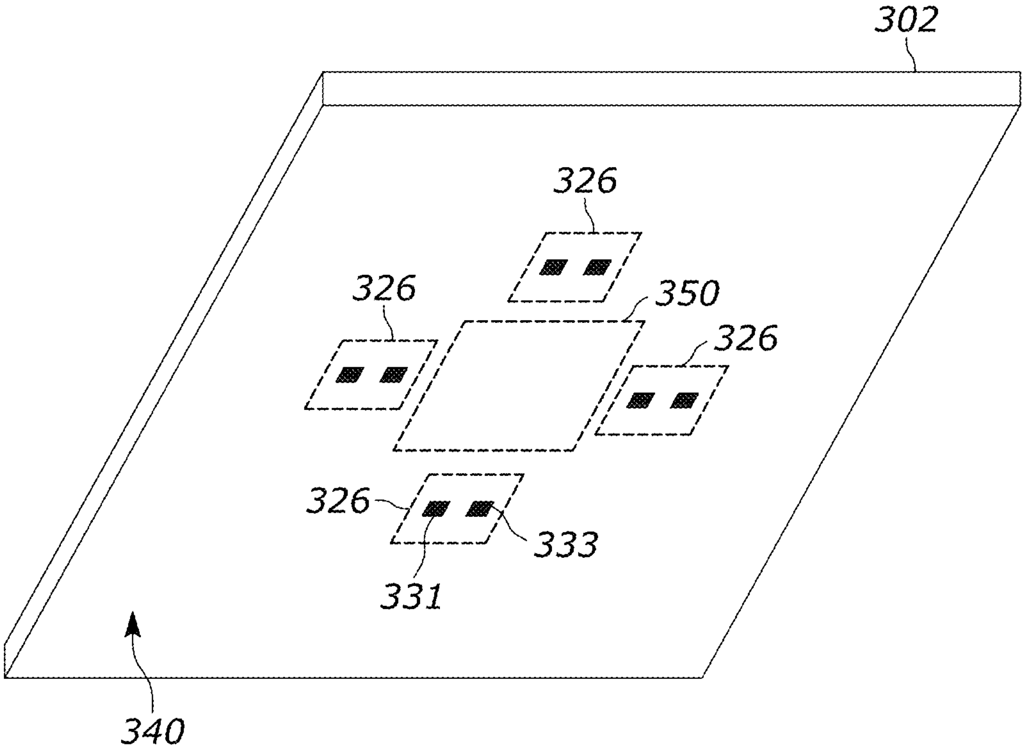
FIG. 3B is a bottom perspective view of the EIC of FIG. 3A.

FIG. 3B is a bottom perspective view of the EIC 302 of FIG. 3A. The dashed line boxes in the bottom perspective view of the EIC represent the locations of the first portion 326 of each photonic transceiver in the EIC and the location of the switching circuitry 350 as projected onto the bottom major surface 340 of the EIC. As described above, the first portion of a photonic transceiver has a driver and an amplifier, which are implemented through electronic circuits that are fabricated on a substrate of the EIC. However, in the example of FIG. 3B, only a driver interface 331 and an amplifier interface 333 of each photonic transceiver are exposed, e.g., visible, at the bottom major surface of the EIC. In an example, the driver interface and the amplifier interface of each photonic transceiver are conductive elements that can be electrically connected to electrical interconnects, such as the electrical interconnects described above. In an example, the driver interface and the amplifier interface may each include one or more conductive pads.

Figure 3C:
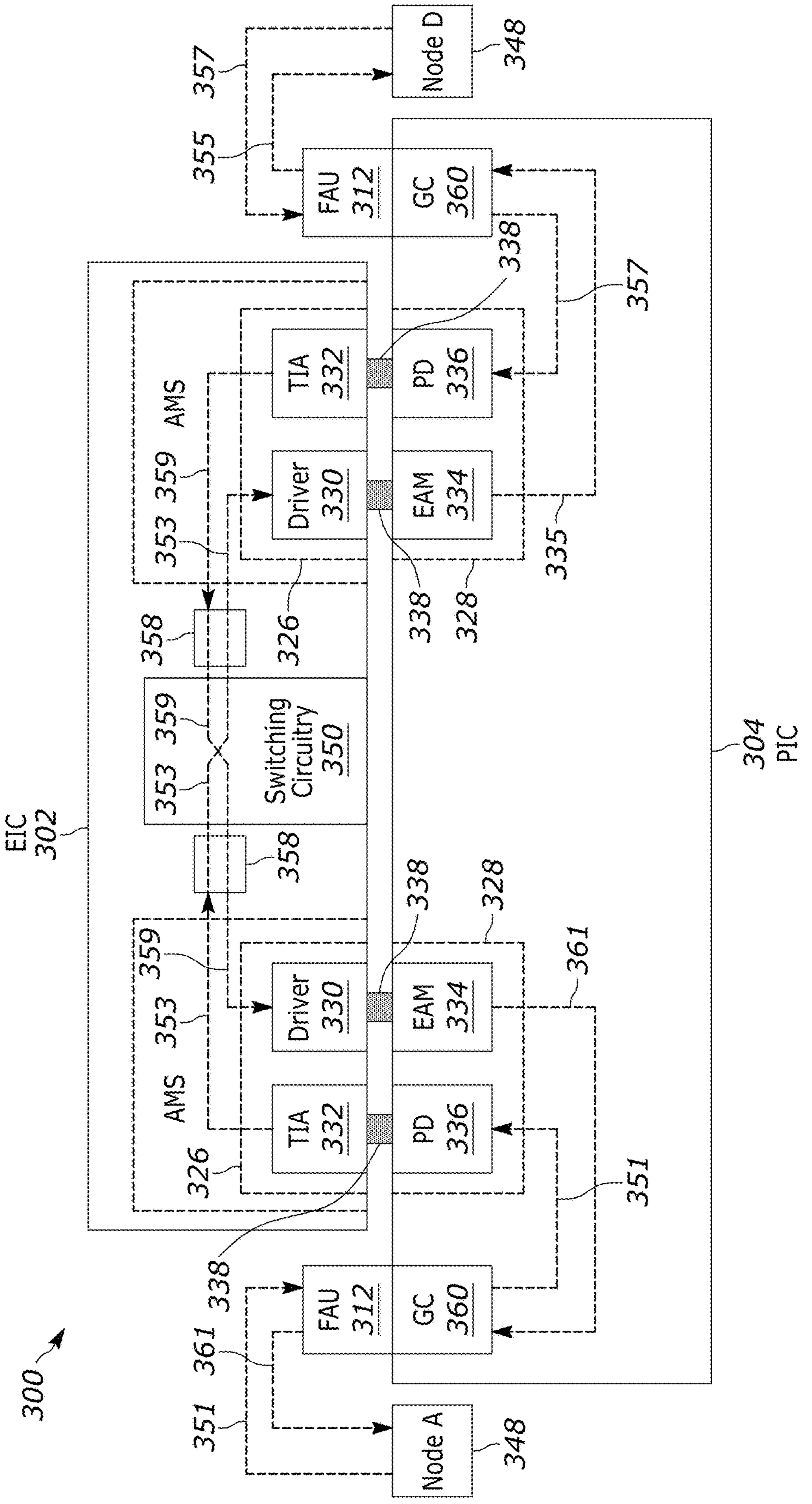
FIG. 3C is a side cutaway view of the multiport network switch from FIG. 3A.

FIG. 3C is a side cutaway view of the multiport network switch 300 from FIG. 3A that depicts components of the multiport network switch including the photonic transceivers that are formed across the EIC 302 stacked on the PIC 304 and the switching circuitry 350 of the EIC. With reference to FIG. 3C, the left side shows elements (e.g., FAU 312) of the photonic transceiver corresponding to optical port, P4, which is optically connected to node A, and the right side shows elements (e.g., FAU 312) of the photonic transceiver corresponding to optical port, P2, which is optically connected to node D. FIG. 3C also illustrates the switching of network traffic from node A to node D and the switching of network traffic from node D to node A. However, FIG. 3C does not depict a light engine, an optical port for the light engine, or any other optical components that may be fabricated in the PIC such as splitters, multiplexers, and demultiplexers, or connected to the PIC such as FAUs or optical fibers.

With reference to the left side of FIG. 3C, the photonic transceiver corresponding to optical port, P4, includes a first portion 326 in the EIC 302 and a second portion 328 in the PIC 304. The first portion of the photonic transceiver in the EIC includes a driver 330 and an amplifier 332 and the second portion of the photonic transceiver in the PIC includes a modulator 334 and a photodetector 336. Likewise, with reference to the right side of FIG. 3C, the photonic transceiver corresponding to optical port, P2, includes a first portion 326 in the EIC and a second portion 328 in the PIC. The first portion of the photonic transceiver in the EIC includes a driver 330 and an amplifier 332 and the second portion of the photonic transceiver in the PIC includes a modulator 334 and a photodetector 336. In the example, the driver of each photonic transceiver is vertically aligned with the corresponding modulator so that the electrical interconnect 338 can electrically connect between the driver interface (not shown) and the modulator interface (not shown) over a very short distance (e.g., less than 50 microns) and the amplifier of each photonic transceiver is vertically aligned with the corresponding photodetector so that the electrical interconnect can electrically connect between the amplifier interface (not shown) and the photodetector interface (not shown) over a very short distance (e.g., less than 50 microns). The EIC also includes the switching circuitry 350, which may include a switch fabric, an arbiter, a scheduler, and a MAC table, and interface components 358, which may include, for example, analog-to-digital converters (ADCs), digital-to-analog converters (DACs), serializers, deserializers, and/or media access control (MAC) logic. The EIC may also include circuits that are configured to perform other operations such as, for example, power supply, power management, and management communications. Such circuits may include, for example, one or more processing cores and memory.

The PIC 304 may include grating couplers (GCs) 360, multiplexers, demultiplexers, and waveguides that connect the optical ports to the modulators 334 and to the photodetectors 336. In the example of FIG. 3C, the waveguides support unidirectional photonic channels that can be linked together to form bidirectional photonic channels.

Figure 4:
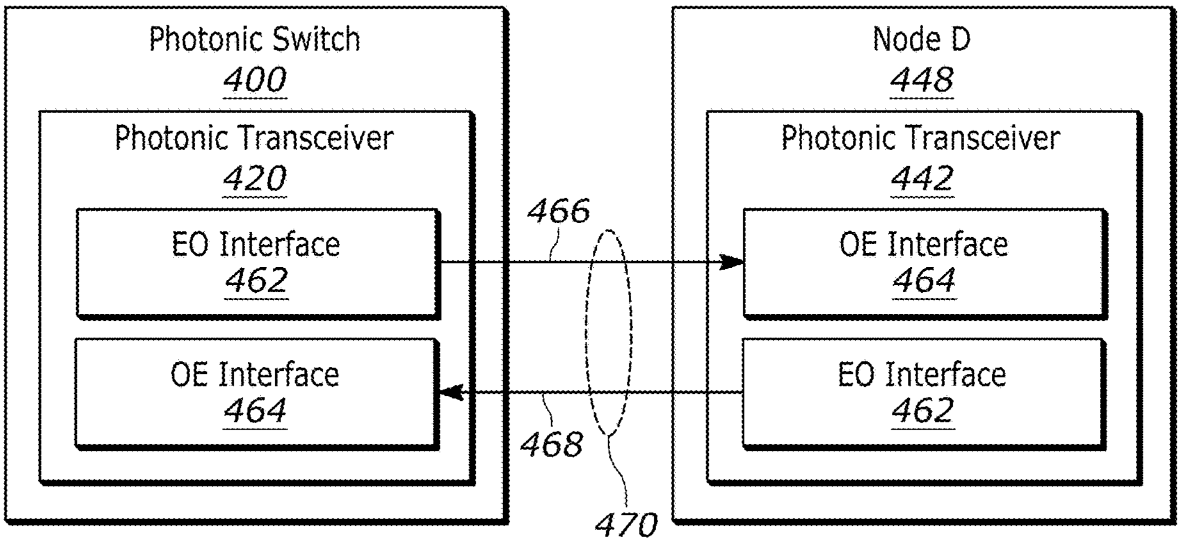
FIG. 4 illustrates the communication of digital data between a multiport network switch and a node.

FIG. 4 illustrates the communication of digital data between a multiport network switch 400 and a node 448, which are similar to the multiport network switch and a node, e.g., node D, from FIGS. 3A and 3C. In particular, FIG. 4 depicts a photonic transceiver 420 in the multiport network switch and a photonic transceiver 420 in node D, although it should be understood that node D may not include a photonic transceiver that is formed from an EIC stacked on a PIC as is the case for the multiport network switch. The photonic transceiver of the multiport network switch includes an electrical-to-optical (EO) interface 462 (e.g., driver/modulator) and an optical-to-electrical (OE) interface 464 (e.g., photodetector/amplifier) and the photonic transceiver of node D includes OE interface 464 (e.g., photodetector/amplifier) and an EO interface 462 (e.g., driver/modulator). As described above, the drivers and the modulators are electrically connected by electrical interconnects between a stacked EIC and PIC and the photodetectors and the amplifiers are electrically connected by electrical interconnects between the stacked EIC and PIC. A unidirectional photonic link 466 is formed between the EO interface of the multiport network switch and the OE interface of node D, and a separate unidirectional photonic link 468, in the opposite direction, is formed between the EO interface of node D and the OE interface of the multiport network switch. Together, the two unidirectional photonic links form a bidirectional photonic link 470. In an example, the unidirectional photonic links include optical fibers that connect the multiport network switch and node D, although it is possible that the multiport network switch and node D are optically connected by, for example, a PIC or over air.

The photonic transceivers may facilitate converting a message or a signal between the electronic domain and the photonic domain. For example, the photonic transceivers may each include an EO interface for converting electronic signals to optical (e.g., photonic) signals, and may include an OE interface for converting optical signals to electronic signals. While FIG. 4 only shows photonic transceiver as having the EO interface and OE interface, it should be understood that each of the photonic interfaces on the multiport network switch may include one or both of these interfaces and typically includes a plurality of each to support multiple unidirectional photonic links in both directions connecting to the optical port, for example, to support wavelength division multiplexing (WDM) or other schemes. Referring back to FIG. 3A, in some embodiments, each of the optical ports 316 of the multiport optical switch 300 is associated with and optically coupled to a photonic transceiver 320 of the multiport optical switch via optical waveguides 356.

Examples of switching data from node A to node D and from node D to node A are now described with reference back to FIG. 3C.

First, an example of switching data from node A to node D via the multiport network switch 300 is described. In the example, some digital data at node A is intended to be transmitted to node D but to get to node D, the digital data travels through the multiport network switch. In an operation, the digital data is transmitted via optical signals from node A to optical port, P4, of the multiport network switch in the optical path 351, e.g., via an optical fiber. The optical signals enter into the multiport network switch via the FAU 312 and GC 360 corresponding to optical port, P4, and travel on optical path 351 in an optical waveguide within the PIC to the photodetector 336 of the photonic transceiver corresponding to optical port, P4. The photodetector converts the optical signals to electrical signals and the electrical signals are conducted via the electrical interconnect 338 to the amplifier 332 of the photonic transceiver. The amplifier of the photonic transceiver amplifies the electrical signals and provides the amplified electrical signals via electrical path 353 to the interface 358 that corresponds to the photonic transceiver. The interface converts the electrical signals to digital signals, e.g., to binary digital data, and the switching circuitry 350 determines, based on information in the digital signals, where to transfer the digital signals. For example, the switching circuitry determines from a 12-bit value in a header portion of the digital signals where to transfer the digital signals. In an example, the digital signals are transmitted as digital data in protocol data units (PDUs), also referred to as packets, with each PDU including a header. The header includes information that is used to determine where to transfer the digital data within the multiport network switch.

In the example of FIG. 3C, the switching circuitry 350 determines that the digital signals should be transferred to the photonic transceiver that corresponds to optical port, P2, of the multiport network switch 300. In an example, the 12-bit value in the header portion of the digital signals is indicative of node D and the 12-bit value is mapped in the switching circuitry (e.g., in a MAC table of the switching circuitry) to node D and to the output port on the multiport optical switch that corresponds to node D. The electrical path 353 through the switching circuitry in FIG. 3C represents the digital signals being transferred from the photonic transceiver corresponding to optical port, P4, to the photonic transceiver corresponding to optical port, P2, via the switching circuitry. After traversing the switching circuitry, the digital signals are received at the interface 358 of the photonic transceiver corresponding to optical port, P2, where the digital signals may be deserialized, and/or converted from digital signals to analog signals. In another example, the driver 330 is controlled by digital signals from the interface to drive the driver. In either case, in response to the signals from the interface, the driver generates electrical signals that are output to the modulator 334 via the electrical interconnect 338. The modulator modulates an optical carrier (not shown) that is supplied to the modulator (e.g., from an external light source) in response to the electrical signals from the driver and the modulated optical carrier propagates through an optical waveguide in the PIC on optical path 355 to the GC 360 and to the FAU 312 corresponding to optical port, P2. The modulated optical carrier is output from the multiport network switch at optical port, P2, and provided to node D via the optical path 355, e.g., via an optical fiber.

A similar operation is implemented for digital data that is transmitted from node D to node A via the multiport network switch 300. In the example, some digital data at node D is intended to be transmitted to node A but to get to node A, the data travels through the multiport network switch. In an operation, the digital data is transmitted via optical signals from node D to optical port, P2, of the multiport network switch in the optical path 357, e.g., via an optical fiber. The optical signals enter into the multiport network switch via the FAU 312 and GC 360 corresponding to optical port, P2, and travel on optical path 357 in an optical waveguide within the PIC 304 to the photodetector 336 of the photonic transceiver corresponding to port, P4. The photodetector converts the optical signals to electrical signals and the electrical signals are conducted via the electrical interconnect 338 to the amplifier 332 of the photonic transceiver. The amplifier of the photonic transceiver amplifies the electrical signals and provides the amplified electrical signals via electrical path 359 to the interface 358 that corresponds to the photonic transceiver. The interface converts the electrical signals to digital signals, e.g., to binary digital data, and the switching circuitry 350 determines, based on information in the digital signals, where to transfer the digital signals. For example, the switching circuitry determines from a 12-bit value in a header portion of PDUs where to transfer the digital signals. In the example of FIG. 3C, the switching circuitry determines that the digital signals should be transferred to the photonic transceiver that corresponds to optical port, P4, of the multiport network switch. The electrical path 359 through the switching circuitry in FIG. 3C represents the digital signals being transferred from the photonic transceiver corresponding to optical port, P2, to the photonic transceiver corresponding to optical port, P4, via the switching circuitry. After traversing the switching circuitry, the digital signals are received at the interface 358 of the photonic transceiver corresponding to optical port, P4, where the digital signals may be deserialized, and/or converted from digital signals to analog signals to drive the driver 330. In another example, the driver is controlled by digital signals. In either case, in response to signals from the driver, the driver generates electrical signals that are output to the modulator 334 via the electrical interconnect 338. The modulator modulates an optical carrier (not shown) that is supplied to the modulator in response to the electrical signals from the driver and the modulated optical carrier propagates through an optical waveguide in the PIC on optical path 361 to the GC 360 and the FAU 312 corresponding to optical port, P4. The modulated optical carrier is output from the multiport network switch at optical port, P4, and provided to node A via the optical path 361, e.g., via an optical fiber.

In the example described with reference to FIG. 3A-3C, the photonic transceivers 320 are located in an interior region of the EIC 302 and are close to the switching circuitry 350. Because the photonic transceivers can be located anywhere in the EIC, the number of photonic transceivers that can be included on the EIC is not limited by the beachfront (e.g., the perimeter dimensions) of the EIC. Thus, if desired, more photonic transceivers can be included in the EIC than if the location of the photonic transceivers was limited exclusively to the beachfront (e.g., the edges) of the EIC. Additionally, because the photonic transceivers are not limited exclusively to the beachfront of the EIC, the photonic transceivers can be strategically located near the switching circuitry in a manner that reduces the physical distance that signals must travel through the switching circuitry to be transferred from one photonic transceiver to another photonic transceiver to implement multiport network switching. Therefore, because the multiport network switch employs photonic transceivers that are formed by an EIC stacked on a PIC, the transformation of signals from the optical domain to the electrical domain and the transformation of signals from the electrical domain to the optical domain does not have to happen at the beachfront, or edges, of the EIC, but can instead happen wherever the drivers and amplifiers are fabricated on the EIC. Thus, the number of optical ports that can be included on such a multiport network switch is not limited to the beachfront, or edge dimensions, of the EIC. Additionally, the photonic transceivers can be strategically located within the EIC to reduce transmission distances across the switching circuitry, which may reduce power consumption and latency of the multiport network switch.

A common architecture in data centers involves a leaf-spine configuration of end nodes and switches. Leaf-spine network architectures are efficient at providing resilient connectivity between clusters of nodes, which may include, for example, compute resources and/or memory resources. In an example, a multiport network switch is configured for use in a leaf-spine network architecture that connects multiple racks of nodes, e.g., compute nodes and/or memory nodes, to each other. In one particular example, the multiport network switch is configured with twenty optical ports for communicating data between nodes in the leaf-spine network architecture, sixteen of which are configured for use as leaf ports and four of which are configured for use as spine ports. An example of a multiport network switch that is configured for use in a leaf-spine network architecture is described with reference to FIG. 5A-5C and FIG. 6.

Figure 5A:
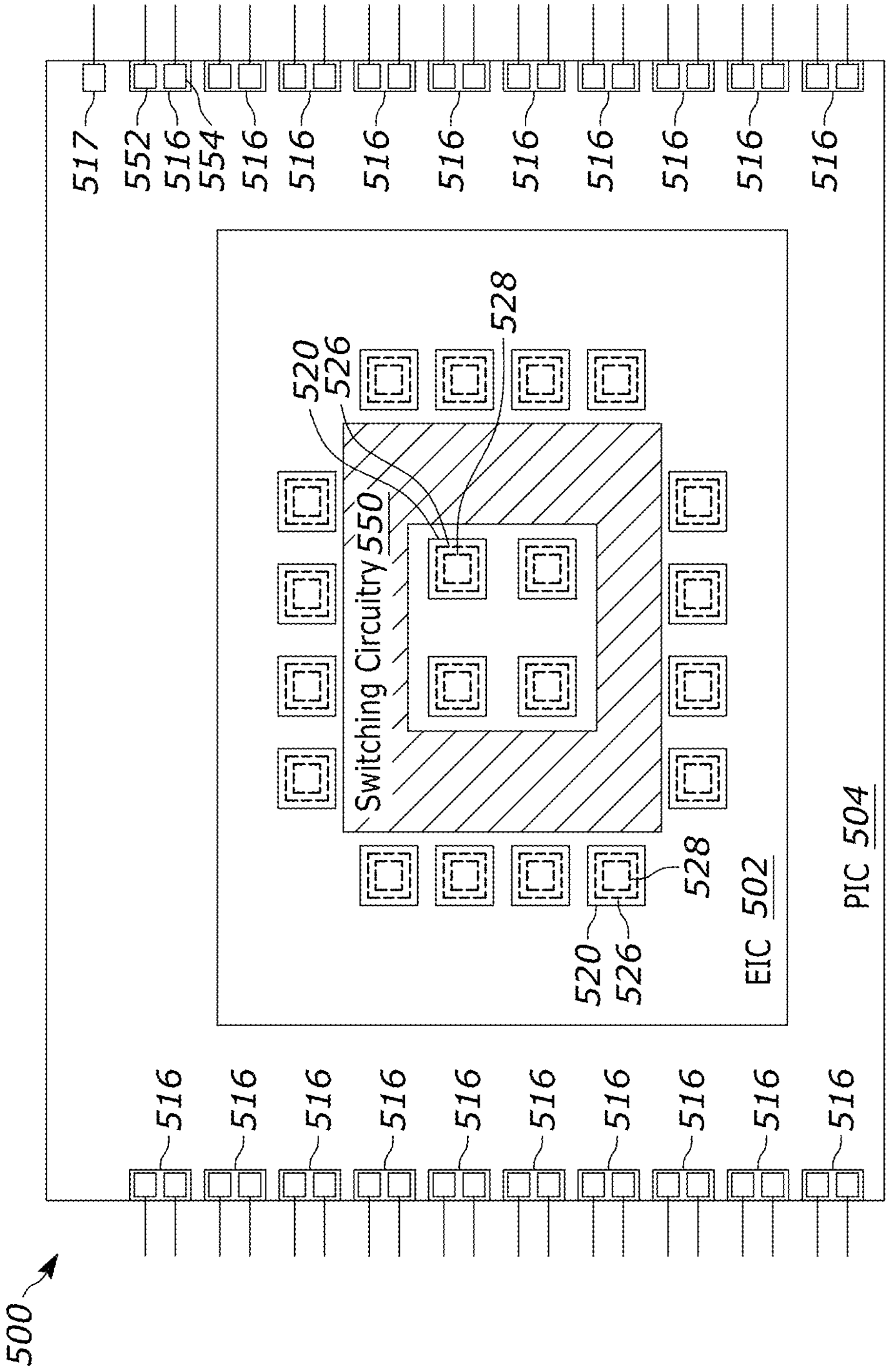
FIG. 5A is a top view of an example multiport network switch that is configured for use in a leaf-spine network architecture.

FIG. 5A is a top view of an example of a multiport network switch 500 that is configured for use in a leaf-spine network architecture. Similar to the multiport network switch described with reference to FIG. 3A-3C, the multiport network switch includes an EIC 502 stacked on a PIC 504, with multiple photonic transceivers 520 located in an interior region of the EIC.

In the example of FIG. 5A, the multiport network switch 500 may be optically connected to network nodes (not shown) that may include compute/memory nodes and to switch nodes. An example application of the multiport network switch in a leaf-spine network architecture is described below. As described with reference to FIG. 3A-3C, the multiport network switch is able to switch network traffic from an input optical port of the multiport network switch to an output optical port of the multiport network switch based on information in the network traffic that is received at the input optical port of the multiport network switch. For example, the multiport network switch is able to determine where to switch received network traffic based on header information in the received network traffic. In the example of FIG. 5A, the multiport network switch includes an EIC 502 stacked on a PIC 504 as illustrated in the top view and the PIC includes optical ports 516 that can be optically connected to other network nodes. For example, the multiport optical switch includes twenty optical ports that are optically coupled to other nodes in the leaf-spine network architecture and one optical port 517 that is optically connected to a light engine (e.g., a laser light source). Although the multiport network switch has twenty-one optical ports, it should be understood that the number of optical ports of the multiport network switch can be different. In an example, the multiport network switch includes twenty photonic transceivers 520, with each photonic transceiver having a first portion 526 in the EIC (e.g., a driver and an amplifier) and a second portion 528 in the PIC (e.g., a modulator and a photodetector), and the EIC includes switching circuitry 550. For example, the switching circuitry may include a switch fabric, an arbiter, a scheduler, and a MAC table. In an example, the switch fabric is a crosspoint matrix in which each photonic transceiver can be individually connected to each of the other photonic transceivers. In an example, each of the twenty optical ports 516 of the multiport network switch is optically connected to a corresponding one of the photonic transceivers 520 and includes two optical interfaces in the PIC, one optical interface 552 to receive optical signals from an external device, e.g., from a network node, and one optical interface 554 to output optical signals to an external device, e.g., to the same node. In an example, each optical interface of an optical port is part of a unidirectional optical channel in the PIC that includes the optical interface, an optical waveguide, and a second portion of a photonic transceiver component, e.g., either a modulator or a photodetector. Two unidirectional optical channels of an optical port combine to form a bidirectional optical channel between the multiport network switch and another node, e.g., a compute node or a memory node. Additionally, it should be understood that the multiport network switch may utilize WDM (e.g., with multiple optical channels in parallel) to increase channel density and thus overall data switching capacity.

As illustrated in the top view of FIG. 5A, a first portion 526 of a photonic transceiver 520, which is in the EIC 502, is vertically aligned with a corresponding second portion 528 of the photonic transceiver, which is in the PIC 504. Additionally, as shown in the top view of FIG. 5A, the photonic transceivers are located in an interior region of the EIC and not at an edge, or edges, of the EIC as is conventional.

Figure 5B:
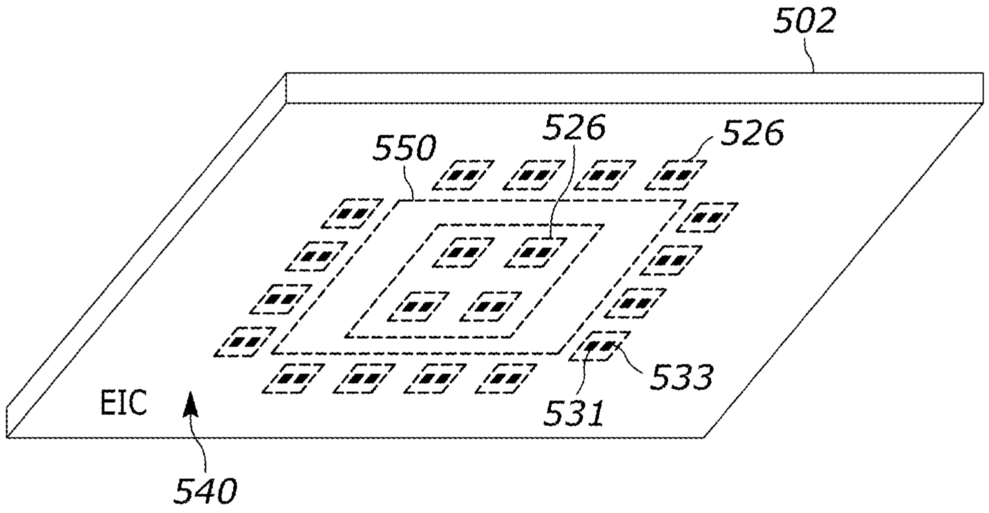
FIG. 5B is a bottom perspective view of the EIC of FIG. 5A.

FIG. 5B is a bottom perspective view of the EIC 502 of FIG. 5A. The dashed line boxes in the bottom perspective view of the EIC represent the locations of the first portion 526 of each photonic transceiver in the EIC and the switching circuitry 550 in the EIC as projected onto the bottom major surface 540 of the EIC. As described above, the first portion of a photonic transceiver has a driver and an amplifier, which are implemented through electronic circuits that are fabricated on a substrate of the EIC. However, in the example of FIG. 5B, only a driver interface 531 and an amplifier interface 533 of each photonic transceiver are exposed, e.g., visible, at the bottom major surface of the EIC. In an example, the driver interface and the amplifier interface of each photonic transceiver are conductive elements that can be electrically connected to electrical interconnects, such as the electrical interconnects described above. In an example, the driver interface of each photonic transceiver and the amplifier interface may each include one or more conductive pads.

Figure 5C:
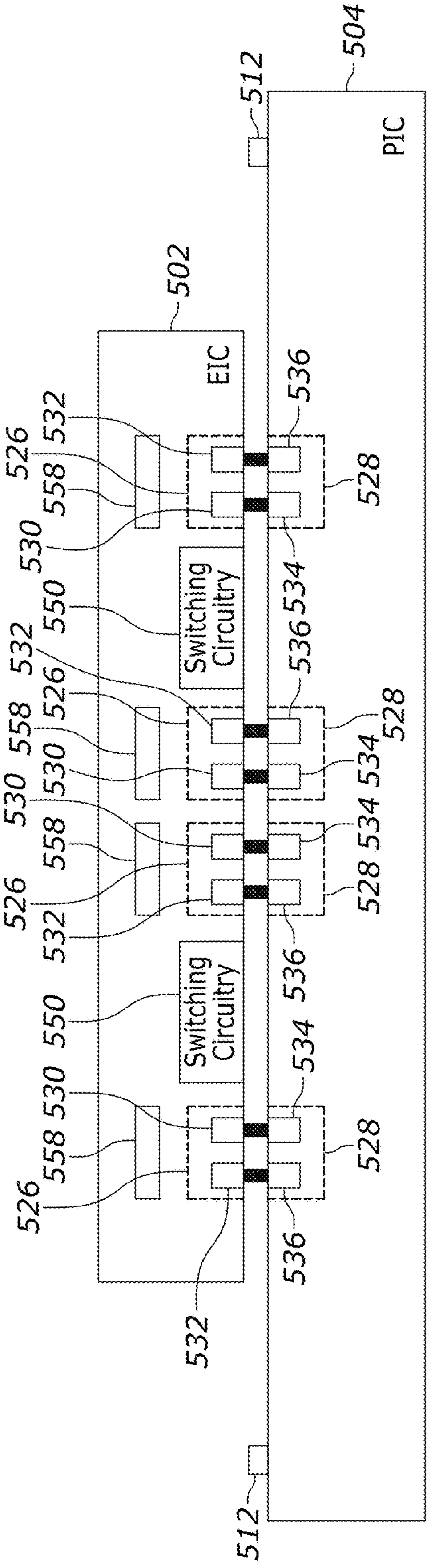
FIG. 5C is a side cutaway view of the multiport network switch from FIGS. 5A and 5B.

FIG. 5C is a side cutaway view of the multiport network switch 500 from FIGS. 5A and 5B that depicts components of the multiport network switch including the first portion 526 and the second portion 528 of the photonic transceivers that are formed across the EIC 502 that is stacked on the PIC 504 and the switching circuitry 550 of the EIC. In particular, FIG. 5C shows elements of two photonic transceivers (e.g., driver 530, amplifier 532, modulator 534, photodetector 536) corresponding to two leaf optical ports and elements of two photonic transceivers (e.g., driver 530, amplifier 532, modulator 534, photodetector 536) corresponding to two spine optical ports.

With reference to FIG. 5C, the photonic transceivers on the left and right sides of the multiport network switch correspond to leaf optical ports and each photonic transceiver includes a first portion in the EIC 502 and a second portion in the PIC 504. The first portion of each photonic transceiver in the EIC includes a driver 530 and an amplifier 532 and the second portion of the photonic transceiver in the PIC includes a modulator 534 and a photodetector 536. The photonic transceivers in the center of the multiport network switch correspond to spine optical ports and each of the photonic transceivers includes a first portion in the EIC and a second portion in the PIC. The first portion of each photonic transceiver in the EIC includes a driver and an amplifier and the second portion of each photonic transceiver in the PIC includes a modulator and a photodetector. In the example, the driver of each photonic transceiver is vertically aligned with the corresponding modulator so that the electrical interconnect 538 between the EIC and the PIC can electrically connect between the driver interface (not shown) and the modulator interface (not shown) over a very short distance (e.g., less than 50 microns) and the amplifier of each photonic transceiver is aligned with the corresponding photodetector so that the electrical interconnect between the EIC and the PIC can electrically connect between the amplifier interface (not shown) and the photodetector interface (not shown) over a very short distance (e.g., less than 50 microns). The EIC also includes the switching circuitry 550, which may include a switch fabric, an arbiter, a scheduler, and a MAC table, and interface components, which may include, for example, ADCs, DACs, serializers, deserializers, and/or MAC logic. The EIC may also include circuits that are configured to perform other operations such as, for example, power supply, power management, and management communications. Such circuits may include, for example, one or more processing cores and memory.

The PIC 504 may also include grating couplers (GCs), splitters, multiplexers, demultiplexers, and waveguides that are optically coupled between the optical ports and the modulators and the photodetectors. In the example of FIG. 5C, the waveguides in the PIC (not shown) support unidirectional photonic channels that can be linked together to form bidirectional photonic channels. Additionally, it should be understood that the multiport network switch may utilize WDM to increase channel density and thus overall data switching capacity.

Figure 6:
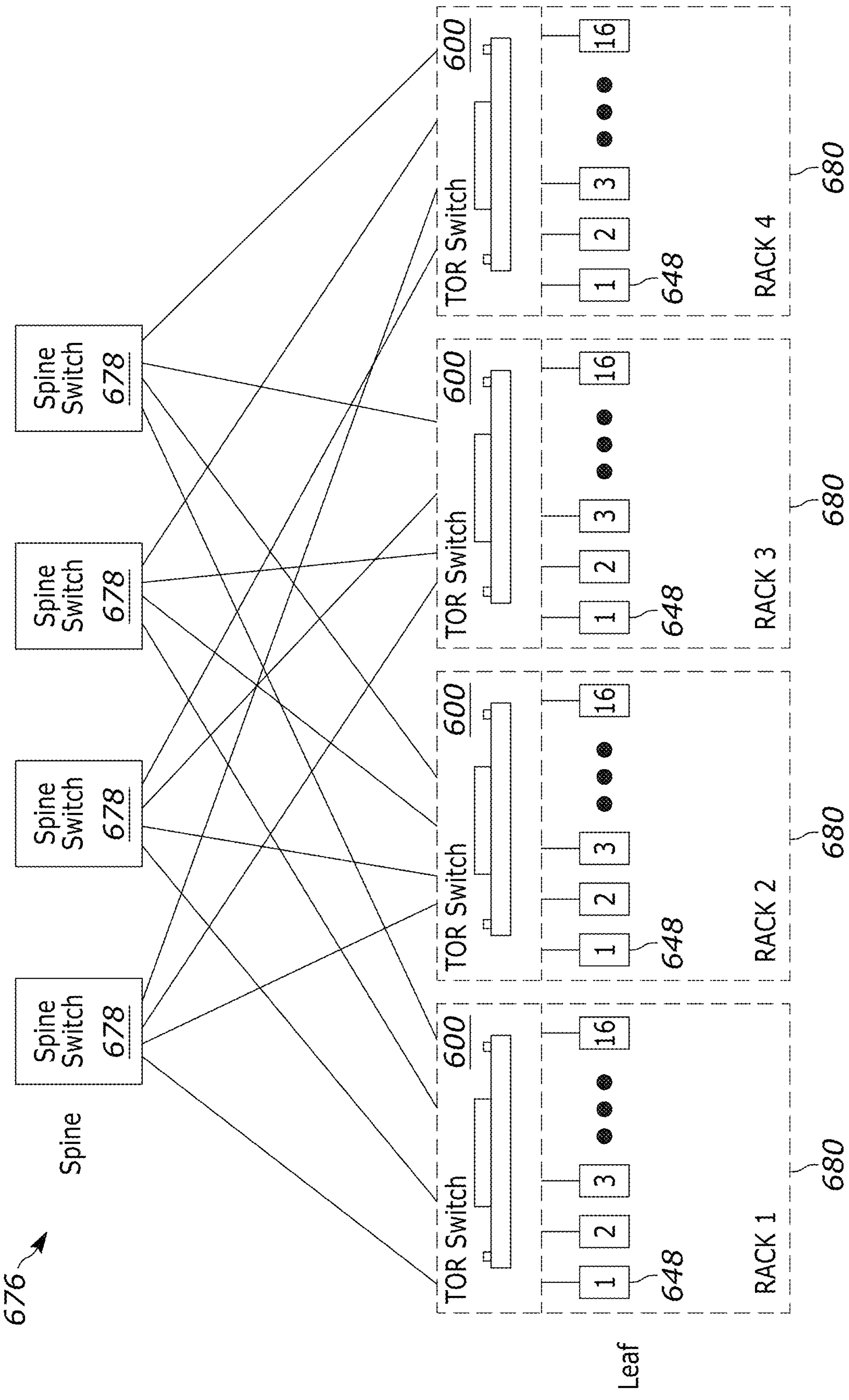
FIG. 6 is an example of a leaf-spine network architecture in which multiport network switches as described with reference to FIG. 5A-5C are used as switches in the leaf-spine network architecture.

In an example, the multiport network switch 500 described with reference to FIG. 5A-5C is configured for use as a multiport network switch in a leaf-spine network architecture. FIG. 6 is an example of a leaf-spine network architecture 676 in which multiport network switches 600 as described with reference to FIG. 5A-5C are used as switches, often referred to as Top-of-Rack (ToR) switches, in the leaf-spine network architecture. In the example leaf-spine network architecture of FIG. 6, there are four spine switches 678 and four racks 680 that include end nodes 648, in which each end node may include compute resources and/or memory resources. In the example, each rack includes sixteen end nodes although the number of racks and the number of endnotes may differ. In the leaf-spine network architecture, the end nodes are considered leaf nodes. Each rack also includes a ToR switch 600, which is a multiport network switch as described above with reference to FIG. 5A-5C.

In the example of FIG. 6, the four spine switches 678 are coupled to each of the racks 680 via the ToR switches 600 and the ToR switch of each rack is connected to each one of the four spine switches via its spine ports and the ToR switch of a rack is connected to each one of the sixteen nodes 648 in the rack by its leaf ports. Using the leaf-spine network architecture shown in FIG. 6, any node in a rack can communicate with any node in another rack in the network via any one of the four spine switches, which provides a high level of redundancy that can be useful to provide resiliency against a spine switch failure and to support load balancing of traffic between the spine switches. In some leaf-spine network architectures, each rack may include at least two ToRs to provide resiliency against a ToR switch failure.

Figure 7:
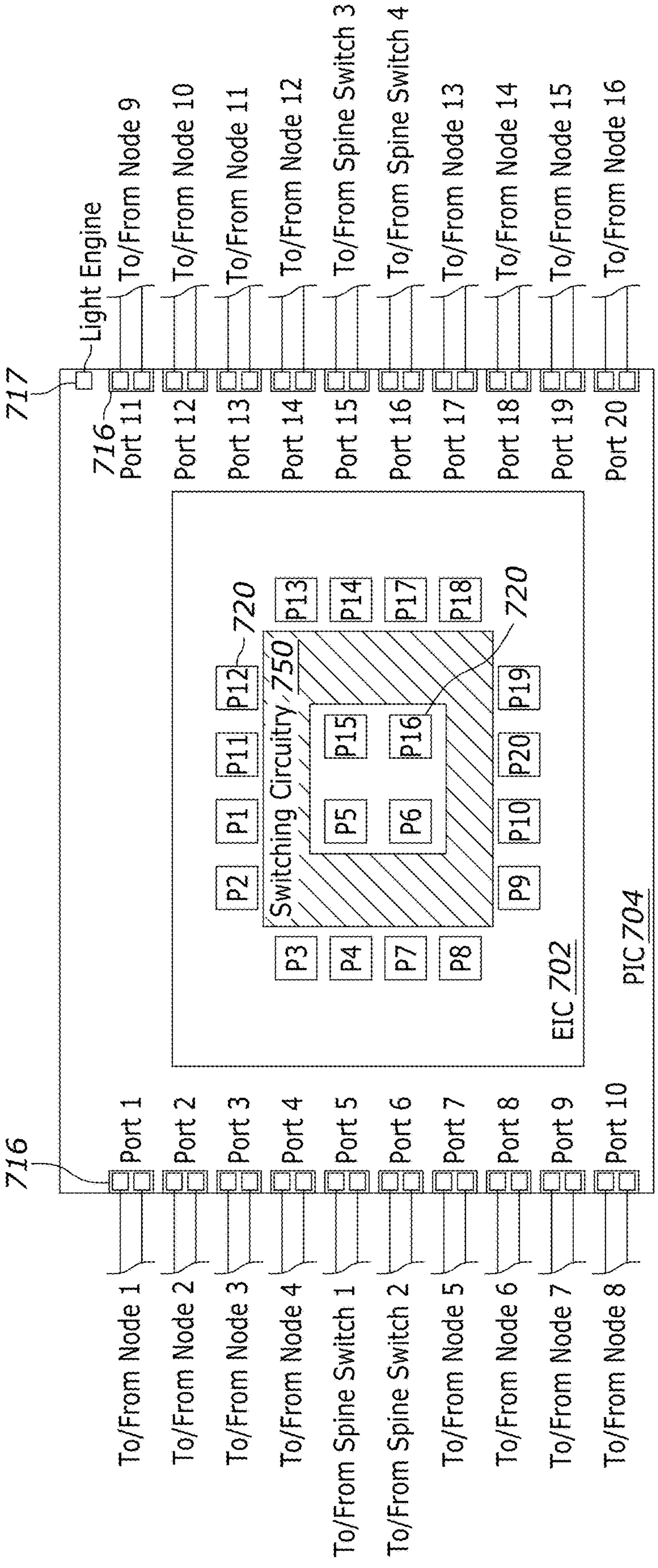
FIG. 7 is a top view of the multiport network switch as described with reference to FIG. 5A-5C in which the optical ports of the multiport network switch are labeled with the node or spine switch to which the optical port is optically coupled and in which the photonic transceivers are labeled with the corresponding optical port numbers to which the photonic transceivers are optically coupled.

In an example and with reference back to FIG. 5A, the photonic transceivers 520 that surround the switching circuitry (e.g., the leaf photonic transceivers) are used for connecting to the end nodes (leaf nodes) and the photonic transceivers that are surrounded by the switching circuitry (e.g., the spine photonic transceivers) are used for connecting to the spine switches. FIG. 7 is a top view of the multiport network switch 700 as described with reference to FIG. 5A-5C in which the optical ports 716 of the multiport network switch are labeled with the node or spine switch to which the optical port is optically coupled and in which the photonic transceivers 720 are labeled with the corresponding optical port numbers to which the photonic transceivers are optically coupled. With reference to FIG. 7, the left side of the PIC 704 of the multiport network switch has ten optical ports, labeled Port 1-Port 10 and the right side of the PIC of the multiport network switch has ten optical ports, labeled Port 11-Port 20. Each of the optical ports is optically coupled to a photonic transceiver and each optical port has a bidirectional optical channel (not shown), including one unidirectional optical channel for receiving optical signals from off of the multiport network switch and one unidirectional optical channel for transmitting optical signals from the multiport network switch. For example, optical port, Port 1, is optically coupled to the photonic transceiver labeled P1, optical port, Port 2, is optically coupled to the photonic transceiver labeled P2, and so on. FIG. 7 also identifies the node or spine switch to which an optical port is optically coupled. For example, the optical port to node/spine switch couplings are:

port 1: node 1;
port 2: node 2;
port 3: node 3;
port 4: node 4;
port 5: spine switch 1;
port 6: spine switch 2;
port 7: node 5;
port 8: node 6;
port 9: node 7;
port 10: node 8;
port 11: node 9;
port 12: node 10;
port 13: node 11;
port 14: node 12;
port 15: spine switch 3;
port 16: spine switch 4;
port 17: node 13;
port 18: node 14;
port 19: node 15;
port 20: node 16.

In a leaf-spine network architecture 676 as shown in FIG. 6, it is expected that a large volume of network traffic will be traveling between the racks 680. Any network traffic that travels between racks must pass through a ToR switch 600 and will either enter the ToR switch at a leaf port and exit the ToR switch at a spine port, or enter the ToR switch at a spine port and exit the ToR switch at a leaf port. For example, network traffic may be received from leaf node 4 on optical port 4 and transferred to spine switch 2 via optical port 6. In this example, the network traffic is transferred from the photonic transceiver P4 (leaf photonic transceiver) to the photonic transceiver P6 (spine photonic transceiver) via the switching circuitry 750. In this case, it can be beneficial that transferring the data from the leaf photonic transceiver (e.g., P4) to the spine photonic transceiver (e.g., P6) is accomplished with the corresponding electronic signals passing through the switching circuitry as travel distance through the switching circuitry can be relatively small. In another example going in the opposite direction, network traffic may be received from spine switch 2 on optical port 6 and transferred to leaf node 4 via optical port 4. In this example, the network traffic is transferred from the spine photonic transceiver (e.g., P6) to the leaf photonic transceiver (e.g., P4) via the switching circuitry 750. Thus, in an example, having the spine nodes close to the leaf nodes can reduce the amount of physical distance that electrical signals have to propagate across the switching circuitry of the EIC to get from a photonic transceiver corresponding to an input optical port of the multiport network switch to a photonic transceiver corresponding to an output optical port of the multiport network switch.

In the example described with reference to FIGS. 5A-5C, 6, and 7, the spine photonic transceivers (photonic transceivers P5, P6, P15, and P16) are grouped together and surrounded by the switching circuitry 750 and the leaf photonic transceivers (photonic transceivers P1-P4, P7-P14, and P17-P20) are surrounding the switching circuitry and the spine photonic transceivers. Thus, both the leaf photonic transceivers and the spine photonic transceivers are located in an interior region of the EIC and are close to the switching circuitry. Because the multiport network switch employs photonic transceivers that are formed by an EIC stacked on a PIC, the transformation of signals from the optical domain to the electrical domain and the transformation of signals from the electrical domain to the optical domain does not have to happen at the beachfront, or edges, of the EIC, but can instead happen wherever the drivers and amplifiers can be fabricated on the EIC. Thus, the number of ports that can be included on such a multiport network switch is not limited to the beachfront, or edge dimensions, of the EIC and more photonic transceivers may be included in the EIC than if the location of the photonic transceivers was limited exclusively to the beachfront (e.g., the edges) of the EIC. Additionally, because the photonic transceivers are not limited exclusively to the beachfront of the EIC, the photonic transceivers can be strategically located near the switching circuitry in a manner that reduces the physical distance that electrical signals must travel through the switching circuitry to be transferred from one photonic transceiver to another photonic transceiver to implement multiport network switching. For example, having the spine photonic transceivers close to the leaf photonic transceivers on the EIC can reduce the amount of physical distance that electrical signals have to propagate across the switching circuitry of the EIC to get from a photonic transceiver corresponding to an input optical port of the multiport network switch to a photonic transceiver corresponding to an output optical port of the multiport network switch, which can reduce power consumption and reduce latency across the multiport network switch.

Although an example of a multiport network switch with twenty optical ports (16 leaf ports and 4 spine ports) is described, other numbers of optical ports are possible. In an example, a multiport network switch may have an EIC in which some photonic transceivers are located at an interior region of the EIC and some other photonic transceivers are located at the edge (e.g., the beachfront) of the EIC. Additionally, the photonic transceivers can be located in positions on the EIC that are different from those shown in FIG. 5A.

In an example, the ability to locate photonic transceiver in the interior region of the EIC and not at a perimeter edge of the EIC may enable the photonic transceivers to be spaced apart from each other so as to improve the temperature stability around the photonic transceivers.

In the examples described herein, the optical ports are shown in certain locations on the PICs. Although some examples are provided, the locations of the optical ports on a PIC are not limited to the locations as shown herein. For example, the optical ports could all be located on the same side of the PIC, or the optical ports could be located at an interior region of the PIC.

In one example, the photonic transceivers support a bidirectional photonic channel that has a data transmission rate of 56 Gbps in each direction, although other data transmission rates are possible. In an example, multiple photonic channels combine to provide data transmission speeds of 1.8 terabits per second (Tbps) for each optical port. In another example, a multiport network switch has 64 optical ports with a total bandwidth capacity of 115.2 Tbps (e.g., 64 ports×1.8 Tbps)

As used herein, a photonic path may be implemented in an optical transmission medium. The optical transmission medium may include an optical waveguide in a PIC, an optical fiber or other optical transmission medium (such as free space optics or glass-etched waveguide), or some combination of the foregoing.

As used herein, a major surface of the EIC or the PIC is a large planar surface of the EIC and the PIC that is distinct from an edge surface of the EIC or the PIC. Typically, each EIC and PIC has a rectangular shape with two major surfaces and a perimeter edge that includes four edge surfaces. The major surfaces of the EIC and PIC may be referred to as the top and bottom major surfaces, upper and lower major surfaces, and/or first and second major surfaces. In an example, the top major surface and the bottom major surface are terms that refer to the top and bottom planar surfaces of the EIC and PIC relative to the ground or floor as the multiport network switch is intended to be installed in a rack unit of a data center.

Figures 8, 9:
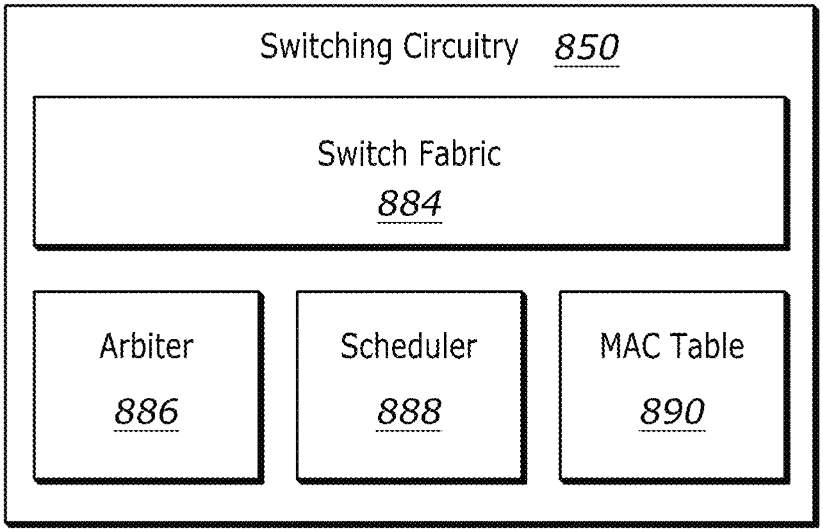
FIG. 8 is an example of the switching circuitry that may be implemented in the multiport network switch.
FIG. 9 is an example of a MAC table that can be maintained and utilized by the switching circuitry.

The switching circuitry is configured to direct PDUs (e.g., data packets) from one photonic transceiver corresponding to an optical port to another photonic transceiver corresponding to another optical port within the multiport network switch. FIG. 8 is an example of the switching circuitry 850 that may be implemented in the multiport network switch. As shown in FIG. 8, the switching circuitry includes a switch fabric 884, an arbiter 886, a scheduler 888, and a MAC (Media Access Control) table 890. In an example, the switch fabric forms the core of the switching circuitry, providing a non-blocking matrix that allows multiple simultaneous data paths between the optical ports of the multiport network switch. The arbiter is configured to resolve contention scenarios by determining the order of access to the switch fabric, using, for example, traffic management algorithms to ensure fair and efficient allocation of resources. The scheduler is configured to coordinate the timing and sequence of PDU transmissions through the switching circuitry based on predefined priority levels, optimizing the flow of traffic through the switching circuitry. The MAC table stores the addresses of network nodes, enabling precise packet forwarding by mapping each incoming PDU to its appropriate output optical port. In an example, the switch fabric is a crosspoint matrix switch fabric that includes a grid of switches, or crosspoints, or a crossbar, connecting circuitry corresponding to each input optical port to circuitry corresponding to each output optical port directly. The crosspoint switch fabric architecture is configured to enable multiple simultaneous data transfers between photonic transceivers (and ultimately between optical ports) of the multiport network switch, as each crosspoint operates independently. The crosspoint matrix switch fabric can provide high throughput and low latency. Additionally, the non-blocking nature of the crosspoint matrix ensures that PDUs can always find a path through the switching circuitry of the EIC to their destination, even under heavy traffic loads. In an example, the switch fabric is a shared memory switch fabric that utilizes a central memory buffer to store incoming PDUs before forwarding the PDUs to the appropriate output optical ports. Circuitry of the EIC corresponding to each input optical port writes packets to the shared memory, and circuitry of the EIC corresponding to each output optical port reads packets from the shared memory. A shared memory architecture can simplify the switching process and allow for efficient handling of variable-length PDUs, ensuring that memory is used optimally. Shared memory switch fabrics excel in environments where traffic patterns are unpredictable and where high levels of data contention may occur. The shared memory may also facilitate advanced features such as Quality of Service (QoS) and congestion management. In another example, the switch fabric is a shared bus switch fabric that employs a common communication bus to connect multiple input ports to multiple output ports. When an input port needs to transmit a PDU to an output port, the input port gains control of the bus and transfers the data directly onto the shared bus. In an example, the switching circuitry may include input queuing and/or output queuing. Although some examples of the switching circuitry are described, other embodiments of the switching circuitry are possible.

In an example, some of the switching functionality may be supported by the interfaces (e.g., FIGS. 3C, 358, and FIGS. 5C, 558) that correspond to each of the photonic transceivers. For example, the interfaces that correspond to each photonic transceiver may include buffers that can be used for input and/or output buffering. In an example, the interfaces may break PDUs into smaller flow control units (FLITs) for transfer through the switching circuitry. In one example, the FLITs are fixed sized units of digital data. In some examples, the interfaces and/or the switching circuitry may be configured to break PDUs into FLITs and/or reassemble FLITs into PDUs.

FIG. 9 is an example of a MAC table 990 that can be maintained and utilized by the switching circuitry. In the example of FIG. 9, the MAC table is stored in memory of the EIC and includes a column for a header value (e.g., a 12-bit value), a column for a node identifier (ID), and a column for an optical port identifier (ID). In the example, the switching circuitry obtains a mapping of a 12-bit header value to a particular node ID of a node in the network (e.g., a node in the leaf-spine network of a data center) and to a particular optical port ID of an optical port of the multiport network switch (or to a photonic transceiver that corresponds to the optical port). In one example, the 12-bit value corresponds to a node ID of a node in a network. In an example, the node ID may be an Internet Protocol (IP) address associated with the node. The node ID is mapped to a particular optical port (or to a photonic transceiver that corresponds to the optical port) of the multiport optical switch such that the 12-bit value of a received PDU can be used to lookup the desired optical port (or the desired photonic transceiver that corresponds to the optical port) of the multiport optical switch to which the PDU should be transferred. In one example, the mappings in the MAC table are learned by the switching circuitry of each multiport network switch through a switching protocol, and in another example, the mappings in the MAC table may be provided to each multiport network switch by a management server. Although an example of a MAC table is provided, other configurations of a MAC table are possible.

Figure 10A:
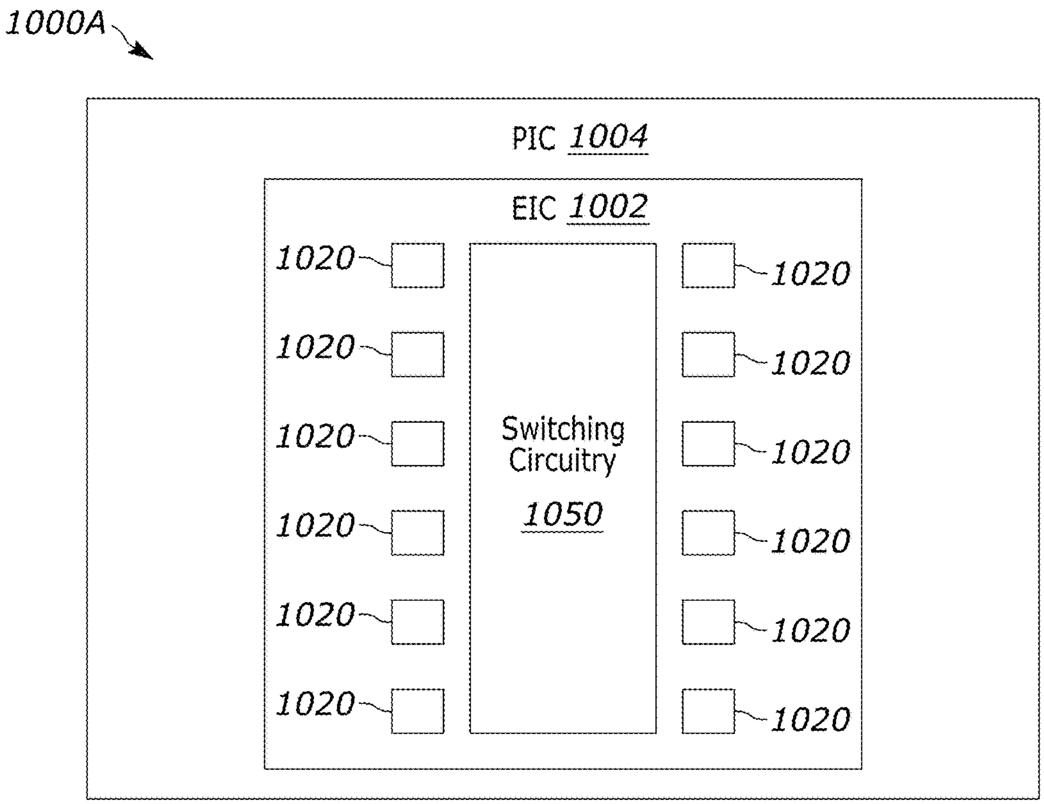
FIG. 10A is an example of a multiport network switch in which the photonic transceivers are located on opposite sides of the switching circuitry.
Figure 10B:
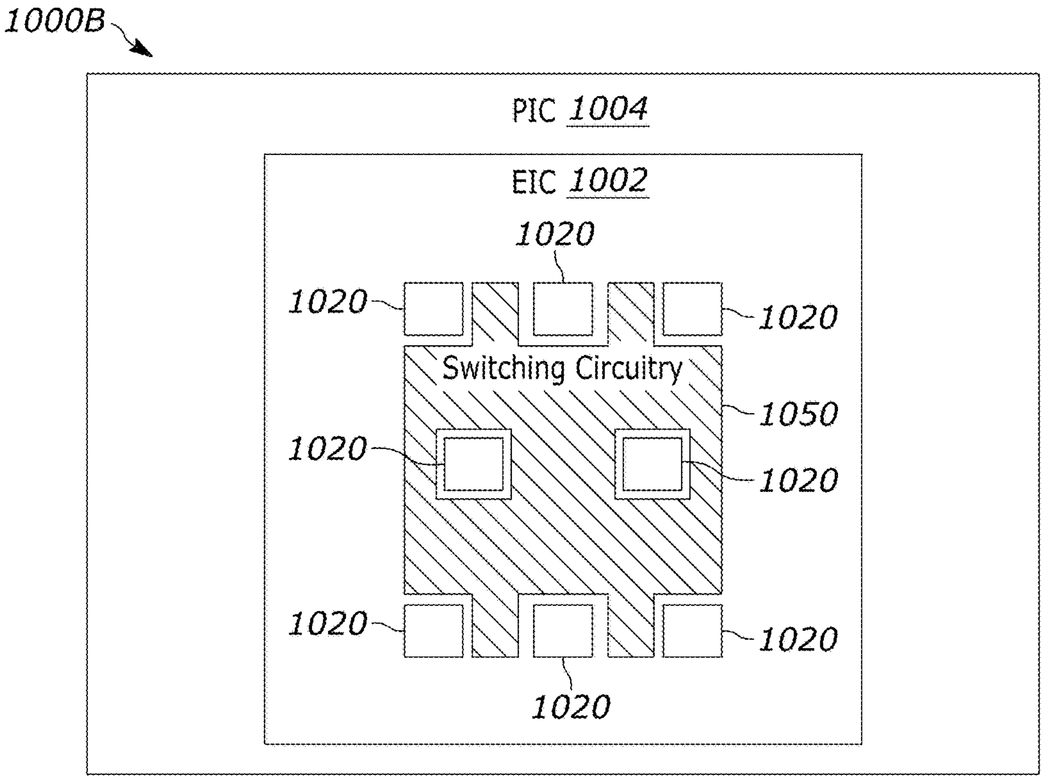
FIG. 10B is an example of a multiport network switch in which the photonic transceivers are arranged in a mesh configuration relative to the switching circuitry.

In the examples described above with reference to FIGS. 3A and 5A, the photonic transceivers are in certain locations on the EIC relative to the switching circuitry. Other locations of the photonic transceivers on the EIC relative to the switching circuitry are possible. FIG. 10A is an example of a multiport network switch 1000A in which the photonic transceivers 1020 formed across the EIC 1002 and PIC 1004 are located on opposite sides of the switching circuitry 1050 and FIG. 10B is an example of a multiport network switch 1000B in which the photonic transceivers 1020 formed across the EIC 1002 and the PIC 1004 are arranged in a mesh configuration relative to the switching circuitry 1050. In the examples of FIGS. 10A and 10B, certain elements of the multiport network switches are not shown for ease of viewing. In an example of a ToR switch used in a leaf-spine network, it may be desirable to locate the spine photonic transceivers in positions where heat can be easily dissipated as the spine optical ports (and corresponding photonic transceivers) are expected to process higher volumes of network traffic than the leaf optical ports (and corresponding photonic transceivers).

Figure 11A:
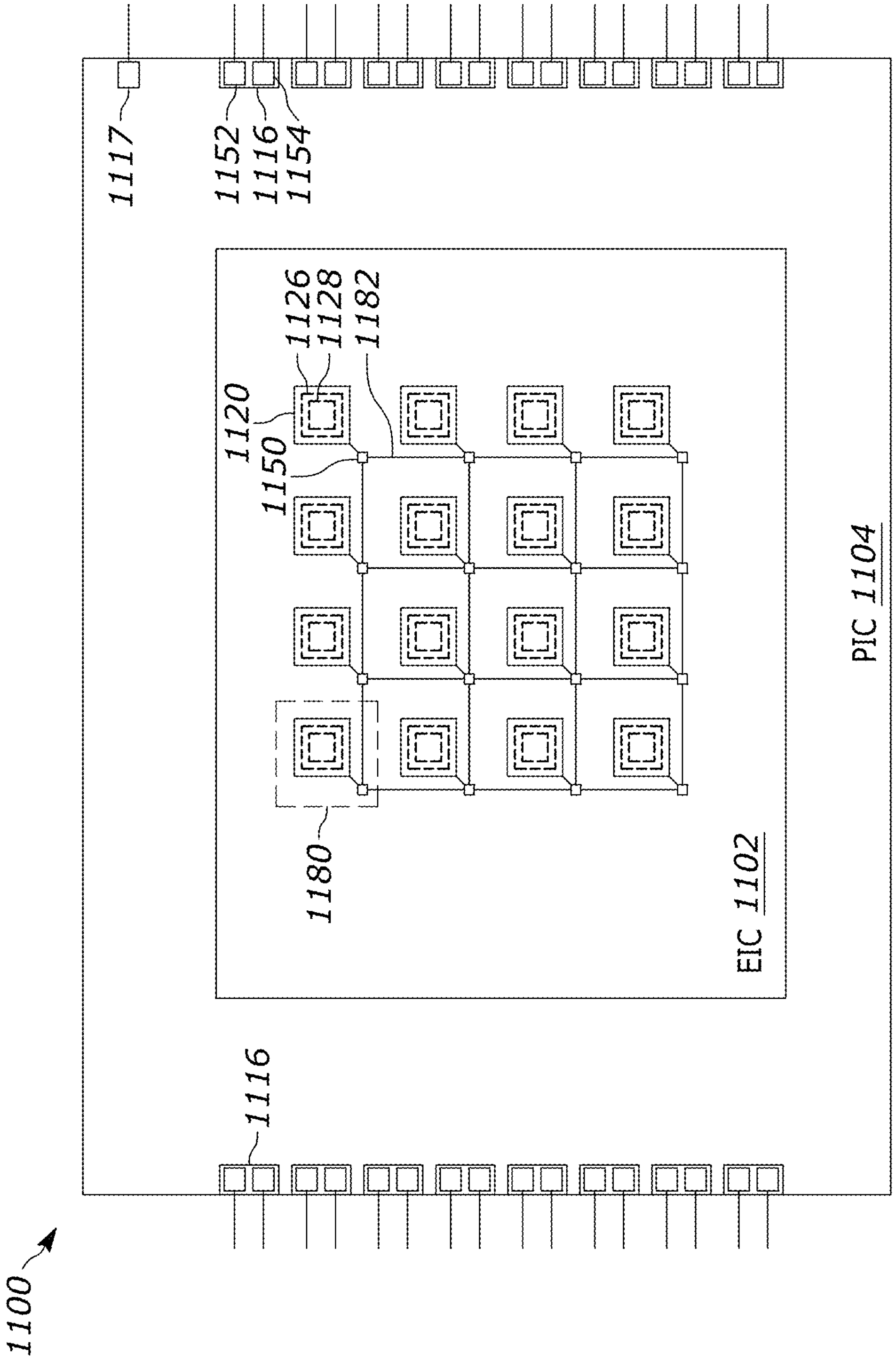
FIG. 11A is a top view of an example of a multiport network switch that is configured with a matrix of photonic transceiver cells.

Although some configurations of photonic transceivers and switching circuitry have been described above, other configurations of photonic transceivers and switching circuitry are possible. In another example, photonic transceiver cells are configured in a matrix, with each photonic transceiver cell including at least one photonic transceiver, an interface, and switching circuitry. FIG. 11A is an example of a multiport network switch 1100 that includes a 4×4 matrix of photonic transceiver cells 1180. In an example, each photonic transceiver cell includes a photonic transceiver 1120 (having a first portion 1126 in the EIC 1102 and a second portion 1128 in the PIC 1104), an interface (not shown) in the EIC, and switching circuitry 1150 in the EIC. As depicted in FIG. 11A, the switching circuitry of each photonic transceiver cell is coupled to the switching circuitry of adjacent photonic transceiver cells by a signal path 1182 (e.g., a conductive path in the EIC). In operation, data is received on an optical port 1116 in the optical domain, converted to the electrical domain, electrically switched to a target photonic transceiver cell, converted from the electrical domain to the optical domain at the corresponding photonic transceiver, and optically transmitted via the PIC to an output optical port of the multiport network switch.

FIG. 11A is a top view of an example of the multiport network switch 1100 that is configured with a matrix of photonic transceiver cells. Similar to the multiport network switch described with reference to FIG. 3A-3C, the multiport network switch includes the EIC 1102 stacked on the PIC 1104, with multiple photonic transceivers 1120 located in an interior region of the EIC. In the example of FIG. 11A, the multiport network switch 1100 may be optically connected to network nodes (not shown) that may include compute/memory nodes and/or to other switch nodes. As described with reference to FIG. 3A-3C, the multiport network switch 1100 is able to switch network traffic from an input optical port of the multiport network switch to an output optical port of the multiport network switch based on information in the network traffic that is received at the input optical port of the multiport network switch. For example, the multiport network switch is able to determine where to switch received network traffic based on header information in the received network traffic. In the example of FIG. 11A, the multiport optical switch includes sixteen optical ports that may be optically coupled to other nodes in a network architecture and one optical port 1117 that is optically connected to a light engine (e.g., a laser light source). Although the multiport network switch has seventeen optical ports, it should be understood that the number of optical ports of the multiport network switch can be different. In an example, the multiport network switch includes sixteen photonic transceivers 1120, with each photonic transceiver having a first portion 1126 in the EIC (e.g., a driver and an amplifier) and a second portion 1128 in the PIC (e.g., a modulator and a photodetector), and the EIC includes switching circuitry 1150. In the example of FIG. 11A, each photonic transceiver includes switching circuitry that corresponds specifically to that photonic transceiver. The switching circuitry may include a switch fabric, an arbiter, a scheduler, and a MAC table as described herein. In an example, the switching circuitry is configured to transfer data to switching circuitry corresponding to another photonic transceiver, or to transfer data to its corresponding photonic transceiver. For example, if data is received on the photonic transceiver from the optical domain (e.g., from the PIC), the switching circuitry will transfer the data in the electrical domain to the switching circuitry corresponding to another photonic transceiver. In an example, the switching circuitry is configured in a matrix (e.g., a 4×4 matrix), and the switching circuitry transfers data to the switching circuitry of a directly adjacent photonic transceiver cell. In an example, each of the sixteen optical ports 1116 of the multiport network switch is optically connected to a corresponding one of the photonic transceivers 1120 and includes two optical interfaces in the PIC, one optical interface 1152 to receive optical signals from an external device, e.g., from a network node, and one optical interface 1154 to output optical signals to an external device, e.g., to the same node. In an example, each optical interface of an optical port is part of a unidirectional optical channel in the PIC that includes the optical interface, an optical waveguide, and a second portion of a photonic transceiver component, e.g., either a modulator or a photodetector. Two unidirectional optical channels of an optical port combine to form a bidirectional optical channel between the multiport network switch and another node, e.g., a compute node or a memory node. Additionally, it should be understood that the multiport network switch may utilize WDM (e.g., with multiple optical channels in parallel) to increase channel density and thus overall data switching capacity.

As illustrated in the top view of FIG. 11A, a first portion 1126 of a photonic transceiver 1120, which is in the EIC 1102, is vertically aligned with a corresponding second portion 1128 of the photonic transceiver, which is in the PIC 1104. Additionally, as shown in the top view of FIG. 11A, the photonic transceivers are located in an interior region of the EIC and not at an edge, or edges, of the EIC as is conventional.

Figure 11B:
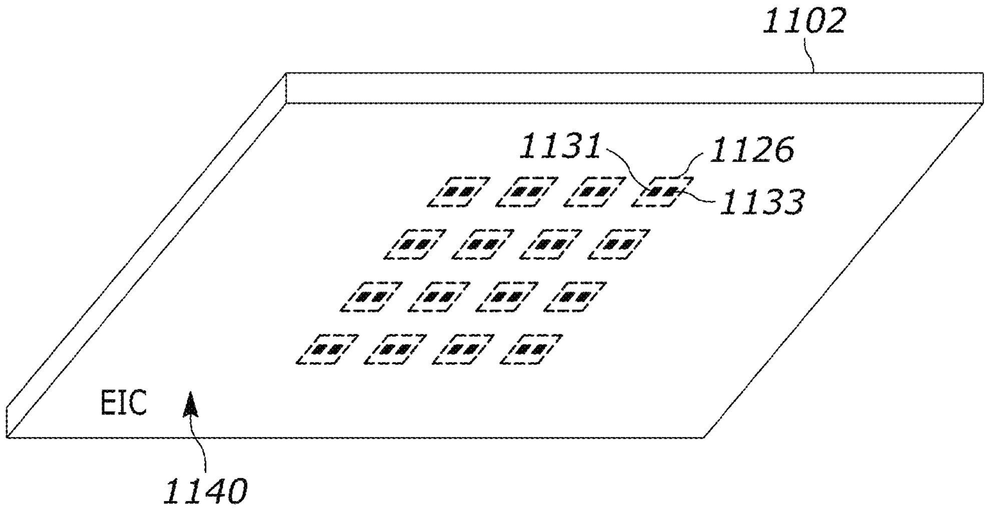
FIG. 11B is a bottom perspective view of the EIC of FIG. 11A.

FIG. 11B is a bottom perspective view of the EIC 1102 of FIG. 11A. The dashed line boxes in the bottom perspective view of the EIC represent the locations of the first portion 1126 of each photonic transceiver in the EIC as projected onto the bottom major surface 1140 of the EIC. The switching circuitry corresponding to each photonic transceiver is not represented in FIG. 11B. As described above, the first portion of a photonic transceiver has a driver and an amplifier, which are implemented through electronic circuits that are fabricated on a substrate of the EIC. However, in the example of FIG. 11B, only a driver interface 1131 and an amplifier interface 1133 of each photonic transceiver are exposed, e.g., visible, at the bottom major surface 1140 of the EIC. In an example, the driver interface and the amplifier interface of each photonic transceiver are conductive elements that can be electrically connected to electrical interconnects, such as the electrical interconnects described above. In an example, the driver interface of each photonic transceiver and the amplifier interface may each include one or more conductive pads.

Figure 11C:
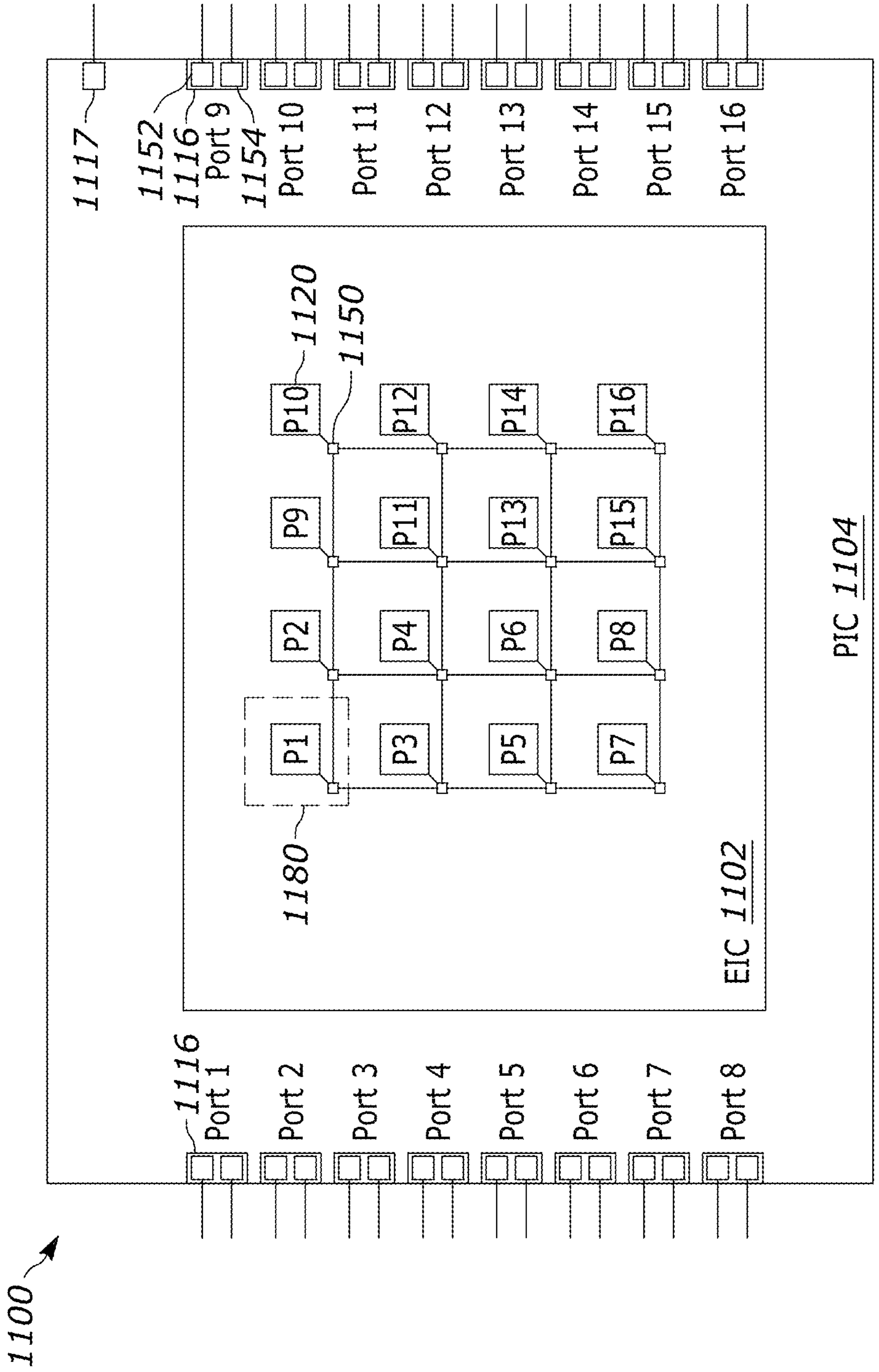
FIG. 11C is a top view of the multiport network switch as described with reference to FIGS. 11A and 11B in which the optical ports and the photonic transceivers are labeled with the corresponding optical port numbers.

FIG. 11C is a top view of the multiport network switch 1100 as described with reference to FIGS. 11A and 11B in which the optical ports 1116 and the photonic transceivers 1120 are labeled with the corresponding optical port numbers. With reference to FIG. 11C, the left side of the PIC 1104 of the multiport network switch has eight optical ports, labeled Port 1-Port 8 and the right side of the PIC of the multiport network switch has eight optical ports, labeled Port 9-Port 16. Each of the optical ports is optically coupled to a photonic transceiver and each optical port has a bidirectional optical channel (not shown), including one unidirectional optical channel for receiving optical signals from off of the multiport network switch and one unidirectional optical channel for transmitting optical signals from the multiport network switch. For example, optical port, Port 1, is optically coupled to the photonic transceiver labeled P1, optical port, Port 2, is optically coupled to the photonic transceiver labeled P2, and so on.

In one example, network traffic may be received on optical port 4 and sent out of the multiport network switch on optical port 6. In this example, the network traffic is transformed from the optical domain to the electrical domain by the photonic transceiver, P4, transferred in the electrical domain of the EIC from the switching circuitry corresponding to photonic transceiver P4 to the switching circuitry corresponding to photonic transceiver P6 via the electrical paths in the EIC that run between the switching circuitry of the adjacent photonic transceiver cells. Then, the network traffic is transformed from the electrical domain to the optical domain by the photonic transceiver P6 and transmitted out optical port P6. In another example, network traffic may be received on optical port 5 and sent out of the multiport network switch on optical port 10. In this example, the network traffic is transformed from the optical domain to the electrical domain by the photonic transceiver, P5, transferred in the electrical domain of the EIC from the switching circuitry corresponding to photonic transceiver P5 to the switching circuitry corresponding to photonic transceiver P10 via the electrical paths in the EIC that run between the switching circuitry of the adjacent photonic transceiver cells. For example, the network traffic may be communicated on a path that hops from the switching circuity corresponding to photonic transceiver cell P5, to the switching circuity corresponding to photonic transceiver cell P6, to the switching circuity corresponding to photonic transceiver cell P13, to the switching circuity corresponding to photonic transceiver cell P14, to the switching circuity corresponding to photonic transceiver cell P12, and finally to the switching circuity corresponding to photonic transceiver cell P10. Then, the network traffic is transformed from the electrical domain to the optical domain by the photonic transceiver P10 and transmitted out optical port P10. Because the multiport network switch employs a matrix of photonic transceiver cells 1180 that are formed by the EIC 1102 stacked on the PIC 1104, the transformation of signals from the optical domain to the electrical domain and the transformation of signals from the electrical domain to the optical domain does not have to happen at the beachfront, or edges, of the EIC, but can instead happen wherever the drivers and amplifiers can be fabricated on the EIC. Thus, the number of ports that can be included on such a multiport network switch is not limited to the beachfront, or edge dimensions, of the EIC and more photonic transceivers may be included in the EIC than if the location of the photonic transceivers was limited exclusively to the beachfront (e.g., the edges) of the EIC. Additionally, because the photonic transceivers are not limited exclusively to the beachfront of the EIC, the photonic transceivers can be strategically located near each other in a manner that reduces the physical distance that electrical signals must travel through the EIC to be transferred from one photonic transceiver to another photonic transceiver to implement multiport network switching. For example, having a closely spaced matrix of photonic transceiver cells can reduce the amount of physical distance that electrical signals have to propagate across the EIC to get from a photonic transceiver corresponding to an input optical port of the multiport network switch to a photonic transceiver corresponding to an output optical port of the multiport network switch, which can reduce power consumption and reduce latency across the multiport network switch.

Figure 12:
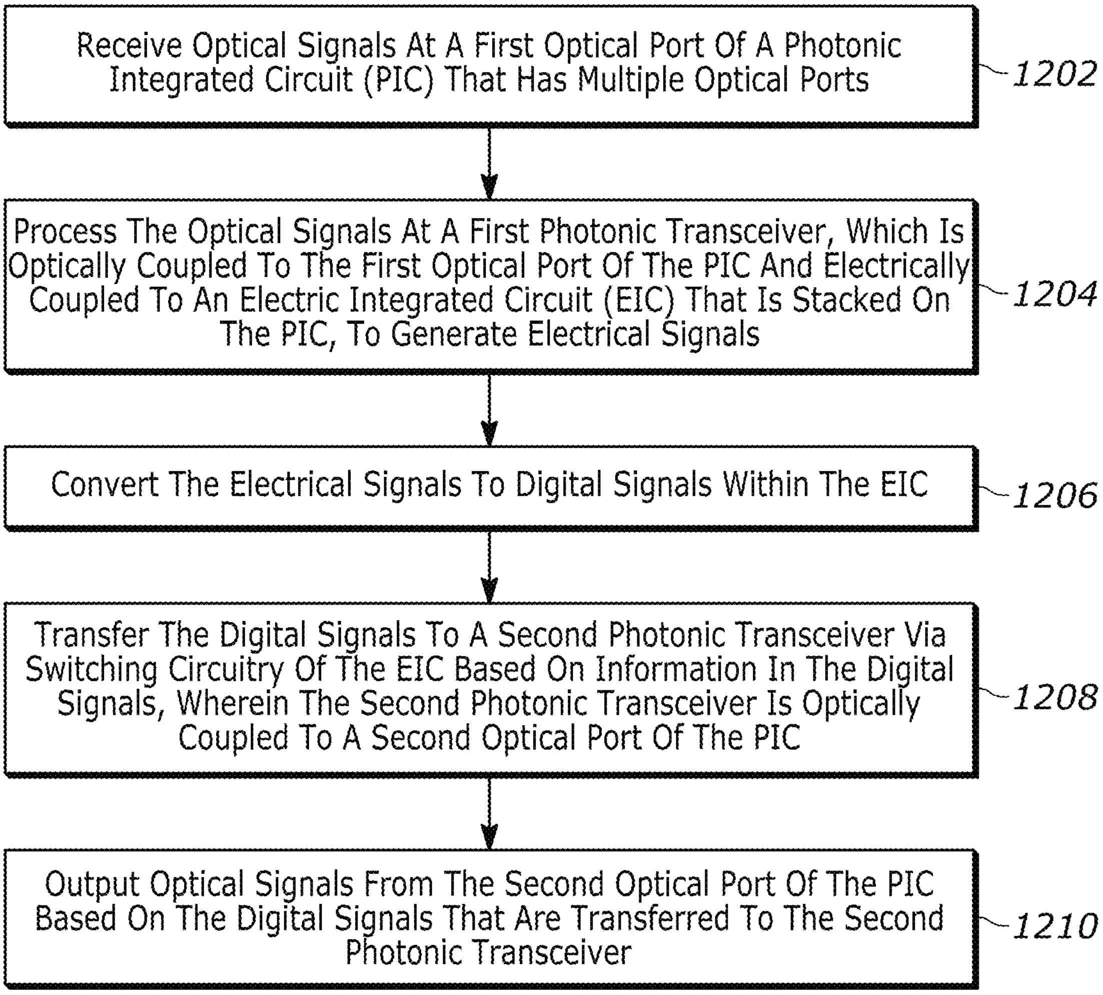
FIG. 12 is a process flow diagram of a method for switching network traffic, using for example, a multiport network switch as described herein.

FIG. 12 is a process flow diagram of a method for switching network traffic, using for example, a multiport network switch as described herein. At block 1202, optical signals are received at a first optical port of a PIC that has multiple optical ports. At block 1204, the optical signals are processed at a first photonic transceiver, which is optically coupled to the first optical port of the PIC and electrically coupled to an EIC that is stacked on the PIC, to generate electrical signals. At block 1206, the electrical signals are converted to digital signals within the EIC. At block 1208, the digital signals are transferred to a second photonic transceiver via switching circuitry of the EIC based on information in the digital signals, wherein the second photonic transceiver is optically coupled to a second optical port of the PIC. At block 1210, optical signals are output from the second optical port of the PIC based on the digital signals that are transferred to the second photonic transceiver.

Figure 13:
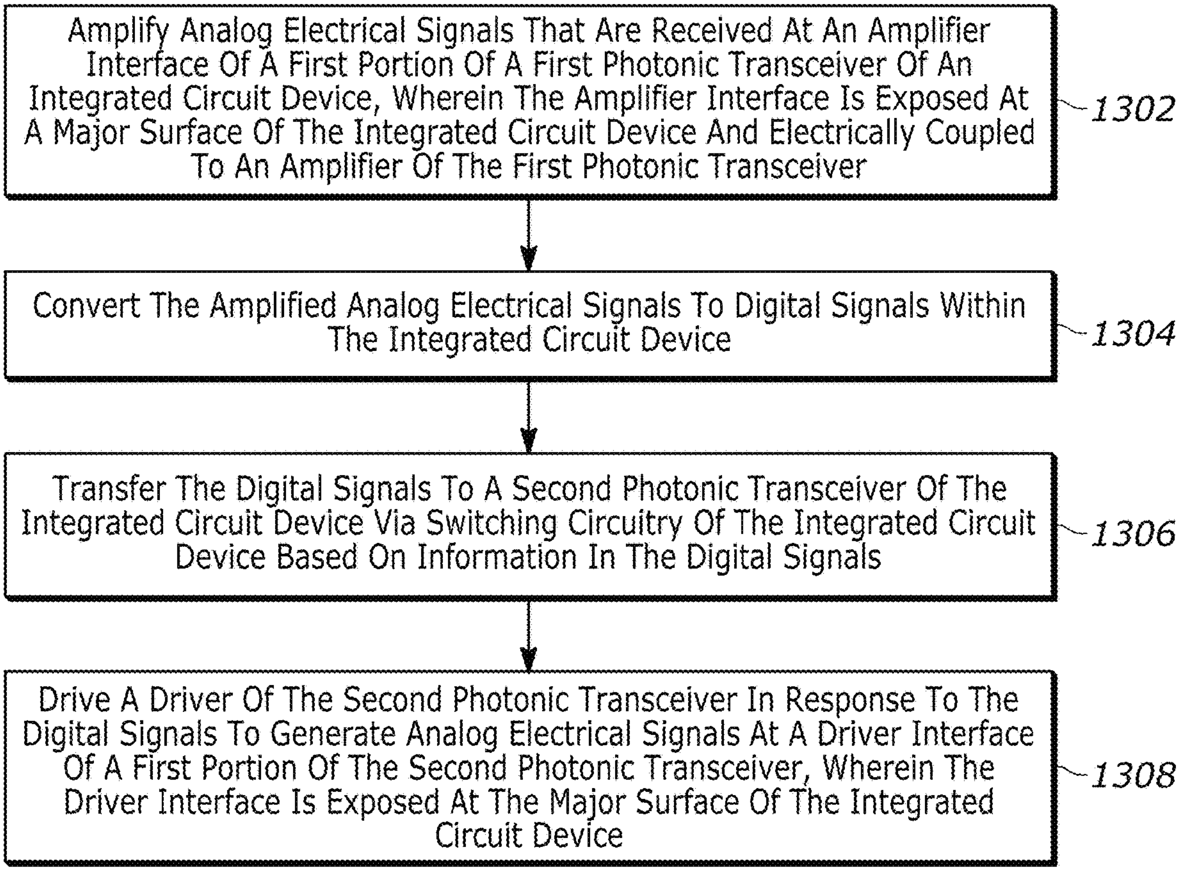
FIG. 13 is a process flow diagram of a method for switching network traffic, using for example, an integrated circuit device (e.g., an EIC) as described herein.

FIG. 13 is a process flow diagram of a method for switching network traffic, using for example, an integrated circuit device (e.g., an EIC) as described herein. At block 1302, analog electrical signals that are received at an amplifier interface of a first portion of a first photonic transceiver of an integrated circuit device are amplified, wherein the amplifier interface is exposed at a major surface of the integrated circuit device and connected to an amplifier of the first photonic transceiver. At block 1304, the amplified analog electrical signals are converted to digital signals within the integrated circuit device. At block 1306, the digital signals are transferred to a second photonic transceiver of the integrated circuit device via switching circuitry of the integrated circuit device based on information in the digital signals. At block 1308, a driver of the second photonic transceiver is driven in response to the digital signals to generate analog electrical signals at a driver interface of a first portion of the second photonic transceiver, wherein the driver interface is exposed at the major surface of the integrated circuit device.

As described above, the EIC and the PIC may be fabricated as separate devices and then physically and electrically coupled to each other via electrical interconnects. In one example, the EIC alone includes novel features of switching circuitry and a plurality of first portions of photonic transceivers, with each first portion of a photonic transceiver including a driver interface exposed at a major surface of the integrated circuit device and an amplifier interface exposed at the major surface of the integrated circuit device, wherein the switching circuitry is configured to transfer digital signals, which are generated from electrical signals received from the first portion of a first photonic transceiver, to the first portion of a second photonic transceiver based on information in the digital signals. In an example, a first set of the plurality of first portions of photonic transceivers corresponds to spine photonic transceivers, and a second set of the plurality of first portions of photonic transceivers corresponds to leaf photonic transceivers. In another example, a first set of the plurality of first portions of photonic transceivers corresponds to spine photonic transceivers, and a second set of the plurality of first portions of photonic transceivers corresponds to leaf photonic transceivers, wherein the switching circuitry surrounds the spine photonic transceivers and the leaf photonic transceivers surround the switching circuitry. In another example, a first set of the plurality of first portions of photonic transceivers corresponds to interior photonic transceivers, and a second set of the plurality of first portions of photonic transceivers corresponds to exterior photonic transceivers, wherein the exterior photonic transceivers surround the interior photonic transceivers. In another example, the EIC has a footprint, wherein the first portions of the photonic transceivers include a set of first portions located in an interior region of the footprint of the integrated circuit device, and a set of first portions located in an exterior region of the footprint of the integrated circuit device.

The connections as discussed herein may be any type of connection suitable to transfer signals or power from or to the respective nodes, units, or devices, including via intermediate devices. The connections may be illustrated or described in reference to being a single connection, a plurality of connections, unidirectional connections, or bidirectional connections. However, different embodiments may vary the implementation of the connections. For example, single connections carrying multiple signals may be separated out into various different connections carrying subsets of these signals. The term "coupled" or similar language may include a direct physical connection or a connection through other intermediate components even when those intermediate components change the form of coupling from a source to a destination.

The present disclosure provides computing systems, implemented by one or more circuit packages (e.g., SIPs), that achieve reduced power consumption and/or increased processing speed. In accordance with various embodiments, power consumed for, in particular, data movement is reduced by maximizing data locality in a circuit package and reducing energy losses when data movement is needed. Power-efficient data movement, in turn, can be accomplished by moving data over small distances in the electronic domain, while leveraging photonic channels for data movement in scenarios where the resistance in the electronic domain and/or the speed at which the data can move in the electronic domain leads to bandwidth limitations that cannot be overcome using existing electronic technology. Thus, in some embodiments, each circuit package includes an electronic integrated circuit (EIC) that includes switching circuitry and photonic transceivers that are connected by bidirectional photonic channels (e.g., implemented in a PIC in a separate layer or chip of the package) into a hybrid, electronic-photonic (or electro-photonic) multiport network switch. The multiport network switch may be connected, by bidirectional photonic channels, to other multiport network switches and/or network nodes (e.g., compute nodes and/or memory nodes). While the described computing system and its various novel aspects are generally applicable to a wide range of networking applications, the computing system is particularly well suited to data centers that are implementing ML models, in particular ANNs. In one example, the computing system is particularly well suited to data centers that utilize leaf-spine network architectures.

As described herein, the present disclosure includes a number of practical applications having features described herein that provide benefits and/or solve problems associated with providing a multiport network switch with sufficient port density, data processing speed, and energy efficiency for effective operation in a data center, e.g., a data center that for processing AI and/or ML models. Some example benefits are discussed herein in connection with various features and functionalities provided by the computing system as described. It will be appreciated that benefits explicitly discussed in connection with one or more embodiments described herein are provided by way of example and are not intended to be an exhaustive list of all possible benefits of the computing system.

The various network topologies enabled by the multiport network switch may provide significant speed and energy savings. For example, photonic transport of data is typically more efficient than an equivalent high-bandwidth electrical interconnect in an EIC of the circuit package itself. By implementing one or more multiport network switches in a data center, the electrical cost of transmitting data may be significantly reduced. A further added benefit is that of being able to control the power density of the system by spacing the location of photonic transceivers on the EIC to optimize cooling efficiency, as the distances and arrangements are not dictated by electrical interfaces.

Particular Implementations

Described implementations of the subject matter can include one or more features, alone or in combination, as described in the following clauses.

Clause 1. A switching system, the switching system comprising:

- a photonic integrated circuit (PIC) having optical ports;
- an electric integrated circuit (EIC) stacked on the PIC and having switching circuitry; and
- photonic transceivers optically coupled to the optical ports of the PIC and electrically coupled to the switching circuitry of the EIC; and
- wherein the switching circuitry is configured to transfer digital signals, which are generated from optical signals received at a first photonic transceiver of the photonic transceivers, to a second photonic transceiver of the photonic transceivers based on information in the digital signals, wherein the first photonic transceiver is optically coupled to a first optical port of the PIC and the second photonic transceiver is optically coupled to a second optical port of the PIC.

Clause 2. The switching system of clause 1, wherein each photonic transceiver includes a first portion in the EIC, a second portion in the PIC, and electrical interconnects that electrically couple the first portion in the EIC and the second portion in the PIC.

Clause 3. The switching system of clause 1 or clause 2, wherein:

- the first portion of each photonic transceiver in the EIC includes a driver and an amplifier; and
- the second portion of each photonic transceiver in the PIC includes a modulator and a photodetector.

Clause 4. The switching system of any of the clauses 1 to 3, wherein:

- the driver of each photonic transceiver includes a driver interface at a bottom major surface of the EIC;
- the amplifier of each photonic transceiver includes an amplifier interface at the bottom major surface of the EIC;
- the modulator of each photonic transceiver includes a modulator interface at a top major surface of the PIC;
- the photodetector of each photonic transceiver includes a photodetector interface at the top major surface of the PIC;
- wherein the driver interface is coupled to the modulator interface by a first electrical interconnect and the amplifier interface is coupled to the photodetector by a second electrical interconnect.

Clause 5. The switching system of any of the clauses 1 to 4, wherein the first portion of each photonic transceiver is vertically aligned with a second portion of a corresponding photonic transceiver.

Clause 6. The switching system of any of the clauses 1 to 5, wherein the second portion of each photonic transceiver in the PIC includes an electro-absorption modulator.

Clause 7. The switching system of any of the clauses 1 to 6, wherein:

- each photonic transceiver includes a first portion in the EIC, a second portion in the PIC, and electrical interconnects that electrically couple the first portion in the EIC and the second portion in the PIC;

the first portion of each photonic transceiver in the EIC includes a driver and an amplifier; and the second portion of each photonic transceiver in the PIC includes a modulator and a photodetector; and wherein the first portion of each photonic transceiver is vertically aligned with a second portion of a corresponding photonic transceiver.

Clause 8. The switching system of any of the clauses 1 to 7, wherein the photonic transceivers are located in an interior region of the EIC.

Clause 9. The switching system of any of the clauses 1 to 8, wherein the EIC has a footprint, and wherein the photonic transceivers include photonic transceivers located in an interior region of the footprint of the EIC.

Clause 10. The switching system of any of the clauses 1 to 9, wherein the photonic transceivers include a first set of photonic transceivers surrounded by the switching circuitry and a second set of photonic transceivers surrounding the switching circuitry.

Clause 11. The switching system of any of the clauses 1 to 10, wherein the photonic transceivers include spine photonic transceivers and leaf photonic transceivers.

Clause 12. The switching system of any of the clauses 1 to 11, wherein the photonic transceivers include spine photonic transceivers surrounded by the switching circuitry, and leaf photonic transceivers surrounding the switching circuitry.

Clause 13. The switching system of any of the clauses 1 to 12, wherein the electrical interconnects are less than 50 microns.

Clause 14. The switching system of any of the clauses 1 to 13, wherein the switching circuitry includes a switch fabric.

Clause 15. The switching system of claim 14 wherein the switch fabric is a crosspoint matrix.

Clause 16. The switching system of clause 15, wherein the PIC includes an optical port configured for connection to a light engine.

Clause 17. A method comprising:

receiving optical signals at a first optical port of a photonic integrated circuit (PIC) that has multiple optical ports;

processing the optical signals at a first photonic transceiver, which is optically coupled to the first optical port of the PIC and electrically coupled to an electric integrated circuit (EIC) that is stacked on the PIC, to generate electrical signals;

converting the electrical signals to digital signals within the EIC;

transferring the digital signals to a second photonic transceiver via switching circuitry of the EIC based on information in the digital signals, wherein the second photonic transceiver is optically coupled to a second optical port of the PIC; and outputting optical signals from the second optical port of the PIC based on the digital signals that are transferred to the second photonic transceiver.

Clause 18. The method of clause 17, wherein:

processing optical signals at the first photonic transceiver includes converting the optical signals to electrical signals at the PIC and amplifying the electrical signals at the EIC; and outputting optical signals at the second photonic transceiver includes generating driver signals at the EIC and modulating an optical carrier at the PIC in response to the driver signals.

Clause 19. The method of clause 17 or clause 18, wherein each optical port of the PIC includes a corresponding photonic transceiver, wherein each photonic transceiver includes a first portion in the EIC, a second portion in the PIC, and electrical interconnects that electrically couple the first portion in the EIC and the second portion in the PIC.

Clause 20. The method of any of the clauses 17 to 19, wherein:

the first portion of each photonic transceiver in the EIC includes a driver and an amplifier; and the second portion of each photonic transceiver in the PIC includes a modulator and a photodetector.

Clause 21. The method of any of the clauses 17 to 20, wherein the first portion of each photonic transceiver is vertically aligned with a second portion of a corresponding photonic transceiver.

Clause 22. The method of any of the clauses 17 to 21, wherein the second portion in the PIC of each photonic transceiver includes an electro-absorption modulator.

Clause 23. The method of any of the clauses 17 to 22, wherein:

the driver of each photonic transceiver includes a driver interface at a bottom major surface of the EIC;

the amplifier of each photonic transceiver includes an amplifier interface at the bottom major surface of the EIC;

the modulator of each photonic transceiver includes a modulator interface at a top major surface of the PIC;

the photodetector of each photonic transceiver includes a photodetector interface at the top major surface of the PIC;

wherein the driver interface is coupled to the modulator interface by a first electrical interconnect and the amplifier interface is coupled to the photodetector by a second electrical interconnect.

Clause 24. The method of any of the clauses 17 to 23, wherein the EIC includes spine photonic transceivers and leaf photonic transceivers, and wherein the first photonic transceiver is a leaf photonic transceiver and the second photonic transceiver is a spine photonic transceiver.

Clause 25. The method of any of the clauses 17 to 24, wherein the EIC includes spine photonic transceivers and leaf photonic transceivers, and wherein the first photonic transceiver is a spine photonic transceiver and the second photonic transceiver is a leaf photonic transceiver.

Clause 26. The method of any of the clauses 17 to 25, wherein the EIC includes a first set of photonic transceivers surrounded by a second set of photonic transceivers, and wherein the first photonic transceiver is in the second set of photonic transceivers and the second photonic transceiver is in the first set of photonic transceivers.

Clause 27. The method of any of the clauses 17 to 26, wherein the EIC includes a first set of photonic transceivers surrounded by a second set of photonic transceivers, and wherein the first photonic transceiver is in the first set of photonic transceivers and the second photonic transceiver is in the second set of photonic transceivers.

Clause 28. The method of any of the clauses 17 to 27, wherein transferring the digital signals to the second photonic transceiver via the switching circuitry based on information in the digital signals involves identifying an output optical port based on a media access control (MAC) table in the switching circuitry.

Clause 29. The method of any of the clauses 17 to 28, further comprising receiving an optical carrier at the PIC.

Clause 30. An integrated circuit device comprising:

switching circuitry; and a plurality of first portions of photonic transceivers, each first portion of a photonic transceiver including a driver and a driver interface that is exposed at a major surface of the integrated circuit device and an amplifier and an amplifier interface that is exposed at the major surface of the integrated circuit device;

wherein the switching circuitry is configured to transfer digital signals, which are generated from electrical signals received from the first portion of a first photonic transceiver, to the first portion of a second photonic transceiver based on information in the digital signals.

Clause 31. The integrated circuit device of clause 30, wherein the major surface of the integrated circuit device is bottom major surface of the integrated circuit device.

Clause 32. The integrated circuit device of clause 30 or clause 31, wherein:

the major surface of the integrated circuit device is a bottom major surface of the integrated circuit device;

the driver interface of each photonic transceiver is located on the bottom major surface of the integrated circuit device to align with a modulator interface on a photonic integrated circuit (PIC); and the amplifier interface of each photonic transceiver is located on the bottom major surface of the integrated circuit device to align with a photodetector interface on the PIC.

Clause 33. The integrated circuit device of any of the clauses 30 to 32, wherein:

the driver interface of each photonic transceiver is located on the integrated circuit device to align with a modulator interface on a photonic integrated circuit (PIC); and the amplifier interface of each photonic transceiver is located on the integrated circuit device to align with a photodetector interface on the PIC.

Clause 34. The integrated circuit device of any of the clauses 30 to 33, wherein the switching circuitry includes a switch fabric.

Clause 35. The integrated circuit device of any of the clauses 30 to 34, wherein the switch fabric is a crosspoint matrix.

Clause 36. The integrated circuit device of any of the clauses 30 to 35, wherein the switching circuitry is configured to identify a photonic transceiver of the integrated circuit device to transfer digital signals to based on information in a media access control (MAC) table that is stored in the integrated circuit device.

Clause 37. The integrated circuit device of any of the clauses 30 to 36, wherein a first set of the plurality of first portions of photonic transceivers surrounds a second set of the plurality of first portions of photonic transceivers.

Clause 38. The switching system of any of the clauses 30 to 37, wherein the integrated circuit device has a footprint, and wherein the first portions of the photonic transceivers are located in an interior region of the footprint of the integrated circuit device.

Clause 39. The integrated circuit device of any of the clauses 30 to 38, wherein a first set of the plurality of first portions of photonic transceivers corresponds to spine photonic transceivers and a second set of the plurality of first portions of photonic transceivers corresponds to leaf photonic transceivers.

Clause 40. The integrated circuit device of any of the clauses 30 to 39, wherein a first set of the plurality of first portions of photonic transceivers corresponds to spine photonic transceivers and a second set of the plurality of first portions of photonic transceivers corresponds to leaf photonic transceivers, wherein the switching circuitry surrounds the spine photonic transceivers and the leaf photonic transceivers surround the switching circuitry.

Clause 41. A method comprising:

amplifying analog electrical signals that are received at an amplifier interface of a first portion of a first photonic transceiver of an integrated circuit device, wherein the amplifier interface is exposed at a major surface of the integrated circuit device and electrically coupled to an amplifier of the first photonic transceiver;

converting the amplified analog electrical signals to digital signals within the integrated circuit device;

transferring the digital signals to a second photonic transceiver of the integrated circuit device via switching circuitry of the integrated circuit device based on information in the digital signals; and driving a driver of the second photonic transceiver in response to the digital signals to generate analog electrical signals at a driver interface of a first portion of the second photonic transceiver, wherein the driver interface is exposed at the major surface of the integrated circuit device.

Clause 42. The method of clause 41, wherein transferring the digital signals to the second photonic transceiver of the integrated circuit device via the switching circuitry based on information in the digital signals involves identifying an output optical port based on a media access control (MAC) table in the switching circuitry.

Clause 43. The method of clause 41 or clause 42, wherein the EIC includes spine photonic transceivers and leaf photonic transceivers, and wherein the first photonic transceiver is a leaf photonic transceiver and the second photonic transceiver is a spine photonic transceiver.

Clause 44. The method of any of the clauses 41 to 43, wherein the EIC includes spine photonic transceivers and leaf photonic transceivers, and wherein the first photonic transceiver is a spine photonic transceiver and the second photonic transceiver is a leaf photonic transceiver.

Clause 45. The method of any of the clauses 41 to 44, wherein the EIC includes interior photonic transceivers surrounded by exterior photonic transceivers, and wherein the first photonic transceiver is an exterior photonic transceiver and the second photonic transceiver is an interior photonic transceiver.

Clause 46. The method of any of the clauses 41 to 45, wherein the EIC includes interior photonic transceivers surrounded by exterior photonic transceivers, and wherein the first photonic transceiver is an interior photonic transceiver and the second photonic transceiver is an exterior photonic transceiver.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

It will be readily understood that the components of the embodiments as generally described herein and illustrated in the figures could be arranged and designed in a wide variety of different configurations. Thus, the following more detailed description of various examples, as represented in the figures, is not intended to limit the scope of the present disclosure, but is merely representative of various embodiments. While the various aspects of the examples are presented in drawings, the drawings are not necessarily drawn to scale unless specifically indicated.

The disclosed technology may be embodied in other specific forms without departing from its spirit or essential characteristics. The described examples are to be considered in all respects only as illustrative and not restrictive. The scope of the disclosed technology is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the disclosed technology should be or are in any single example. Rather, language referring to the features and advantages is understood to mean that a specific feature, advantage, or characteristic described in connection with an example is included in at least one example of the disclosed technology. Thus, discussions of the features and advantages, and similar language, throughout this specification may, but do not necessarily, refer to the same example.

Furthermore, the described features, advantages, and characteristics of the disclosed technology may be combined in any suitable manner in one or more examples. One skilled in the relevant art will recognize, in light of the description herein, that the disclosed technology can be practiced without one or more of the specific features or advantages of a particular example. In other instances, additional features and advantages may be recognized in certain examples that may not be present in all examples of the disclosed technology.

Reference throughout this specification to "one example", "an example", or similar language means that a particular feature, structure, or characteristic described in connection with the indicated example is included in at least one example of the disclosed technology. Thus, the phrases "in one example", "in an example", and similar language throughout this specification may, but do not necessarily, all refer to the same example.

Although specific examples of the disclosed technology have been described and illustrated, the disclosed technology is not to be limited to the specific forms or arrangements of parts so described and illustrated. The scope of the disclosed technology is to be defined by the claims appended hereto and their equivalents.

What is claimed is:

1. An integrated circuit device comprising:

switching circuitry; and a plurality of first portions of photonic transceivers, each first portion of a photonic transceiver including a driver and a driver interface that is exposed at a major surface of the integrated circuit device and an amplifier and an amplifier interface that is exposed at the major surface of the integrated circuit device;

wherein the switching circuitry is configured to transfer digital signals, which are generated from electrical signals received from the first portion of a first photonic transceiver, to the first portion of a second photonic transceiver based on information in the digital signals, wherein a first set of the plurality of first portions of photonic transceivers surrounds a second set of the plurality of first portions of photonic transceivers.

2. The integrated circuit device of claim 1, wherein the major surface of the integrated circuit device is bottom major surface of the integrated circuit device.

3. The integrated circuit device of claim 1, wherein:

the major surface of the integrated circuit device is a bottom major surface of the integrated circuit device;

the driver interface of each photonic transceiver is located on the bottom major surface of the integrated circuit device to align with a modulator interface on a photonic integrated circuit (PIC); and the amplifier interface of each photonic transceiver is located on the bottom major surface of the integrated circuit device to align with a photodetector interface on the PIC.

4. The integrated circuit device of claim 1, wherein:

the driver interface of each photonic transceiver is located on the integrated circuit device to align with a modulator interface on a photonic integrated circuit (PIC); and the amplifier interface of each photonic transceiver is located on the integrated circuit device to align with a photodetector interface on the PIC.

5. The integrated circuit device of claim 1, wherein the switching circuitry includes a switch fabric.

6. The integrated circuit device of claim 1, wherein the switch fabric is a crosspoint matrix.

7. The integrated circuit device of claim 1, wherein the switching circuitry is configured to identify a photonic transceiver of the integrated circuit device to transfer digital signals to based on information in a media access control (MAC) table that is stored in the integrated circuit device.

8. The switching system of claim 1, wherein the integrated circuit device has a footprint, and wherein the first portions of the photonic transceivers are located in an interior region of the footprint of the integrated circuit device.

9. The integrated circuit device of claim 1, wherein a first set of the plurality of first portions of photonic transceivers corresponds to spine photonic transceivers and a second set of the plurality of first portions of photonic transceivers corresponds to leaf photonic transceivers.

10. The integrated circuit device of claim 1, wherein a first set of the plurality of first portions of photonic transceivers corresponds to spine photonic transceivers and a second set of the plurality of first portions of photonic transceivers corresponds to leaf photonic transceivers, wherein the switching circuitry surrounds the spine photonic transceivers and the leaf photonic transceivers surround the switching circuitry.

11. A method comprising:

amplifying analog electrical signals that are received at an amplifier interface of a first portion of a first photonic transceiver of an integrated circuit device comprising an electronic integrated circuit (EIC), wherein the amplifier interface is exposed at a major surface of the integrated circuit device and electrically coupled to an amplifier of the first photonic transceiver;

converting the amplified analog electrical signals to digital signals within the integrated circuit device;

transferring the digital signals to a second photonic transceiver of the integrated circuit device via switching circuitry of the integrated circuit device based on information in the digital signals; and driving a driver of the second photonic transceiver in response to the digital signals to generate analog electrical signals at a driver interface of a first portion of the second photonic transceiver, wherein the driver interface is exposed at the major surface of the integrated circuit device, wherein the EIC includes interior photonic transceivers surrounded by exterior photonic transceivers, and wherein the first photonic transceiver is an exterior photonic transceiver and the second photonic transceiver is an interior photonic transceiver.

12. The method of claim 11, wherein transferring the digital signals to the second photonic transceiver of the integrated circuit device via the switching circuitry based on information in the digital signals involves identifying an output optical port based on a media access control (MAC) table in the switching circuitry.

13. The method of claim 11, wherein the EIC includes spine photonic transceivers and leaf photonic transceivers, and wherein the first photonic transceiver is a leaf photonic transceiver and the second photonic transceiver is a spine photonic transceiver.

14. The method of claim 11, wherein the EIC includes spine photonic transceivers and leaf photonic transceivers, and wherein the first photonic transceiver is a spine photonic transceiver and the second photonic transceiver is a leaf photonic transceiver.

15. The method of claim 11, wherein the EIC includes interior photonic transceivers surrounded by exterior photonic transceivers, and wherein the first photonic transceiver is an interior photonic transceiver and the second photonic transceiver is an exterior photonic transceiver.

16. An integrated circuit device comprising:

switching circuitry; and a plurality of first portions of photonic transceivers, each first portion of a photonic transceiver including a driver and a driver interface that is exposed at a major surface of the integrated circuit device and an amplifier and an amplifier interface that is exposed at the major surface of the integrated circuit device;

wherein the switching circuitry is configured to transfer digital signals, which are generated from electrical signals received from the first portion of a first photonic transceiver, to the first portion of a second photonic transceiver based on information in the digital signals, wherein a first set of the plurality of first portions of photonic transceivers corresponds to spine photonic transceivers and a second set of the plurality of first portions of photonic transceivers corresponds to leaf photonic transceivers, wherein the switching circuitry surrounds the spine photonic transceivers and the leaf photonic transceivers surround the switching circuitry.

17. The integrated circuit device of claim 16, wherein the major surface of the integrated circuit device is bottom major surface of the integrated circuit device.

18. The integrated circuit device of claim 16, wherein:

the major surface of the integrated circuit device is a bottom major surface of the integrated circuit device;

the driver interface of each photonic transceiver is located on the bottom major surface of the integrated circuit device to align with a modulator interface on a photonic integrated circuit (PIC); and the amplifier interface of each photonic transceiver is located on the bottom major surface of the integrated circuit device to align with a photodetector interface on the PIC.

19. The integrated circuit device of claim 16, wherein:

the driver interface of each photonic transceiver is located on the integrated circuit device to align with a modulator interface on a photonic integrated circuit (PIC); and the amplifier interface of each photonic transceiver is located on the integrated circuit device to align with a photodetector interface on the PIC.

20. The integrated circuit device of claim 16, wherein the switching circuitry includes a switch fabric.

21. The integrated circuit device of claim 16, wherein the switch fabric is a crosspoint matrix.

22. The integrated circuit device of claim 16, wherein the switching circuitry is configured to identify a photonic transceiver of the integrated circuit device to transfer digital signals to based on information in a media access control (MAC) table that is stored in the integrated circuit device.

23. A method comprising:

amplifying analog electrical signals that are received at an amplifier interface of a first portion of a first photonic transceiver of an integrated circuit device comprising an electronic integrated circuit (EIC), wherein the amplifier interface is exposed at a major surface of the integrated circuit device and electrically coupled to an amplifier of the first photonic transceiver;

converting the amplified analog electrical signals to digital signals within the integrated circuit device;

transferring the digital signals to a second photonic transceiver of the integrated circuit device via switching circuitry of the integrated circuit device based on information in the digital signals; and driving a driver of the second photonic transceiver in response to the digital signals to generate analog electrical signals at a driver interface of a first portion of the second photonic transceiver, wherein the driver interface is exposed at the major surface of the integrated circuit device, wherein the EIC includes interior photonic transceivers surrounded by exterior photonic transceivers, and wherein the first photonic transceiver is an interior photonic transceiver and the second photonic transceiver is an exterior photonic transceiver.

24. The method of claim 23, wherein transferring the digital signals to the second photonic transceiver of the integrated circuit device via the switching circuitry based on information in the digital signals involves identifying an output optical port based on a media access control (MAC) table in the switching circuitry.

25. The method of claim 23, wherein the EIC includes spine photonic transceivers and leaf photonic transceivers, and wherein the first photonic transceiver is a leaf photonic transceiver and the second photonic transceiver is a spine photonic transceiver.

26. The method of claim 23, wherein the EIC includes spine photonic transceivers and leaf photonic transceivers, and wherein the first photonic transceiver is a spine photonic transceiver and the second photonic transceiver is a leaf photonic transceiver.

* * * * *